US011850908B2

(12) United States Patent
Benouali

(10) Patent No.: US 11,850,908 B2
(45) Date of Patent: Dec. 26, 2023

(54) DEVICE FOR THERMAL MANAGEMENT OF AN ELECTRIC OR HYBRID MOTOR VEHICLE

(71) Applicant: Valeo Systemes Thermiques, Le Mesnil Saint-Denis (FR)

(72) Inventor: Jugurtha Benouali, Le Mesnil Saint Denis (FR)

( * ) Notice: Subject to any disclaimer, the term of this patent is extended or adjusted under 35 U.S.C. 154(b) by 225 days.

(21) Appl. No.: 17/430,510

(22) PCT Filed: Jan. 22, 2020

(86) PCT No.: PCT/FR2020/050083
§ 371 (c)(1),
(2) Date: Aug. 12, 2021

(87) PCT Pub. No.: WO2020/165511
PCT Pub. Date: Aug. 20, 2020

(65) Prior Publication Data
US 2022/0144039 A1 May 12, 2022

(30) Foreign Application Priority Data
Feb. 13, 2019 (FR) ...................... 1901422

(51) Int. Cl.
F25B 7/00 (2006.01)
B60H 1/00 (2006.01)
F25B 40/02 (2006.01)
(52) U.S. Cl.
CPC ..... B60H 1/00278 (2013.01); B60H 1/00921 (2013.01); F25B 40/02 (2013.01);
(Continued)

(58) Field of Classification Search
CPC ............ B60H 1/00278; B60H 1/00921; B60H 2001/00307; B60H 2001/00928;
(Continued)

(56) References Cited

FOREIGN PATENT DOCUMENTS

DE 102016110957 A1 12/2016
FR 3013265 A1 5/2015
(Continued)

OTHER PUBLICATIONS

International Search Report and Written Opinion in corresponding International Application No. PCT/FR2020/050083, dated Mar. 31, 2020 (13 pages).

*Primary Examiner* — Davis D Hwu
(74) *Attorney, Agent, or Firm* — Osha Bergman Watanabe & Burton LLP

(57) ABSTRACT

A thermal management device having an indirect air conditioning circuit for a motor vehicle is disclosed. The device has a first refrigerant fluid loop (A) with a compressor, a two-fluid heat exchanger, a first expansion device, an evaporator, a second expansion device, an evaporator/condenser, and a first by-pass line including a first stop valve, a first and a second internal heat exchanger. A second by-pass line includes a third expansion device arranged upstream from a cooler, a shunt branch comprising a first external radiator. The device also has a second heat transfer fluid loop (B) in which a heat transfer fluid is intended to flow. The two-fluid heat exchanger is arranged jointly on the one hand on the first refrigerant fluid loop downstream of the compressor, between said compressor and the first expansion device, and on the second heat transfer fluid loop (B).

9 Claims, 17 Drawing Sheets

(52) U.S. Cl.
    CPC ............ *B60H 2001/00307* (2013.01); *B60H 2001/00928* (2013.01); *B60H 2001/00949* (2013.01); *B60H 2001/00957* (2013.01); *F25B 2339/047* (2013.01); *F25B 2400/0403* (2013.01); *F25B 2400/0409* (2013.01)

(58) Field of Classification Search
    CPC ...... B60H 2001/00949; B60H 1/00957; F25B 40/02; F25B 2339/047; F25B 2400/0403; F25B 2400/0409
    USPC .......................................................... 62/79
    See application file for complete search history.

(56) References Cited

FOREIGN PATENT DOCUMENTS

| | | |
|---|---|---|
| WO | 03031884 A2 | 4/2003 |
| WO | 2018185412 A1 | 10/2018 |

DEVICE FOR THERMAL MANAGEMENT OF AN ELECTRIC OR HYBRID MOTOR VEHICLE

The invention relates to the field of motor vehicles and more particularly to a thermal management device for a hybrid or electric motor vehicle.

Present-day motor vehicles increasingly comprise a thermal management device comprising an air-conditioning circuit. In general, in a "conventional" air-conditioning circuit, a refrigerant fluid passes successively through a compressor, a first heat exchanger, referred to as a condenser, placed in contact with a flow of air external to the motor vehicle in order to release heat, an expansion device and a second heat exchanger, referred to as an evaporator, placed in contact with a flow of air internal to the motor vehicle in order to cool same.

There are also more complicated air-conditioning circuit architectures that make it possible to obtain an air-conditioning circuit that is reversible, which means to say that it can absorb heat energy from the external air at the first heat exchanger, then referred to as an evaporator/condenser, and release it into the interior of the vehicle, notably by means of a dedicated third heat exchanger.

That is possible notably by using an indirect air-conditioning circuit. What is meant here by indirect is that the air-conditioning circuit comprises two loops for the circulation of two distinct fluids (such as, for example, a refrigerant fluid and glycol-water) in order to perform the various heat exchanges.

The air-conditioning circuit thus comprises a first loop for refrigerant fluid, in which there circulates a refrigerant fluid, a second loop for heat-transfer fluid, in which there circulates a heat-transfer fluid, and a two-fluid heat exchanger arranged jointly on the first loop for refrigerant fluid and on the second loop for heat-transfer fluid, so as to allow exchanges of heat between said loops.

Such an air-conditioning circuit can be used in various modes of operation, although in the context of an electric or hybrid vehicle, the thermal management of elements such as the batteries and the electronic components is performed using a secondary thermal management loop. However, that architecture may prove insufficient for removing the heat that has accumulated in the refrigerant fluid in certain modes, particularly when the batteries require a great deal of cooling power, for example during rapid discharging or charging.

It is therefore one of the objects of the present invention to at least partially overcome the disadvantages of the prior art and propose an improved thermal management device that allows thermal management of elements such as the batteries particularly when a great deal of cooling power is required.

The present invention therefore relates to a thermal management device comprising an indirect air-conditioning circuit for a motor vehicle, comprising:
  a first loop for refrigerant fluid, in which a refrigerant fluid is intended to circulate, said first loop for refrigerant fluid comprising, in the direction of circulation of the refrigerant fluid, a compressor, a two-fluid heat exchanger, a first expansion device, an evaporator, a second expansion device and an evaporator/condenser, and
  a first bypass pipe bypassing the evaporator/condenser and comprising a first shut-off valve,
  a first internal heat exchanger, allowing an exchange of heat between the high-pressure refrigerant fluid leaving the two-fluid heat exchanger and the low-pressure refrigerant fluid leaving the evaporator/condenser or leaving the first bypass pipe.
  a second internal heat exchanger allowing an exchange of heat between the high-pressure refrigerant fluid leaving the first internal heat exchanger and the low-pressure refrigerant fluid circulating in the first bypass pipe,
  a second bypass pipe bypassing the first expansion device and the evaporator, said second bypass pipe comprising a third expansion device positioned upstream of a cooler,
  a diverted branch connecting a first bifurcation positioned downstream of the two-fluid heat exchanger, between said two-fluid heat exchanger and the first internal heat exchanger, to a second bifurcation positioned upstream of the first internal heat exchanger, between said first internal heat exchanger and the first bifurcation, said diverted loop comprising a first external radiator,
  a second loop for heat-transfer fluid in which a heat-transfer fluid is intended to circulate, the two-fluid heat exchanger being arranged jointly, on the one hand, on the first loop for refrigerant fluid downstream of the compressor, between said compressor and the first expansion device, and, on the other hand, on the second loop for heat-transfer fluid.

According to one aspect of the invention, the indirect air-conditioning circuit comprises a device for redirecting the refrigerant fluid leaving the two-fluid heat exchanger directly toward the first internal heat exchanger and/or toward the diverted branch.

According to another aspect of the invention, the device for redirecting the refrigerant fluid leaving the two-fluid heat exchanger comprises:
  a first shut-off valve arranged on the main loop downstream of the first bifurcation, between the first and the second bifurcation, and
  a second shut-off valve arranged on the diverted branch downstream of the first bifurcation, between the first bifurcation and the first external radiator.

According to another aspect of the invention, the device for redirecting the refrigerant fluid leaving the two-fluid heat exchanger comprises a three-way valve arranged at the first bifurcation.

According to another aspect of the invention, the diverted branch comprises a non-return valve arranged downstream of the first external radiator, between said first external radiator and the second bifurcation, so as to block the refrigerant fluid coming from said second bifurcation.

According to another aspect of the invention, the second loop for heat-transfer fluid comprises:
  the two-fluid heat exchanger,
  a first heat-transfer fluid circulation pipe comprising an internal radiator intended to have passing through it a flow of air internal to the motor vehicle, and connecting a first junction point positioned downstream of the two-fluid heat exchanger and a second junction point positioned upstream of said two-fluid heat exchanger,
  a second heat-transfer fluid circulation pipe comprising a second external radiator intended to have passing through it a flow of air external to the motor vehicle, and connecting the first junction point positioned downstream of the two-fluid heat exchanger and the second junction point positioned upstream of said two-fluid heat exchanger, and
  a pump positioned downstream or upstream of the two-fluid heat exchanger, between the first junction point and the second junction point.

According to another aspect of the invention, the thermal management device is configured to operate in a cooling mode in which the refrigerant fluid circulates in the first loop for refrigerant fluid, successively in:
- the compressor where the refrigerant fluid transitions to a high pressure,
- the two-fluid heat exchanger,
- the first external radiator via the diverted branch,
- the first internal heat exchanger,
- the second internal heat exchanger,
- a first part of the refrigerant fluid enters the second bypass pipe, enters the third expansion device where it experiences a drop in pressure and transitions to a low pressure, said low-pressure refrigerant fluid then circulates in the cooler,
- a second part of the refrigerant fluid enters the first expansion device, where it experiences a drop in pressure and transitions to a low pressure, the evaporator and the first bypass pipe,
- the two parts of refrigerant fluid joining back together upstream of the first internal heat exchanger, the refrigerant fluid then passes through at least the first internal heat exchanger before returning to the compressor,
- and wherein, in the second loop for heat-transfer fluid, the heat-transfer fluid leaving the two-fluid heat exchanger circulates in the second external radiator of the second circulation pipe.

According to another aspect of the invention, the thermal management device is configured to operate in a dehumidifying mode in which the refrigerant fluid circulates in the first loop for refrigerant fluid, successively in:
- the compressor where the refrigerant fluid transitions to a high pressure,
- the two-fluid heat exchanger,
- the first external radiator via the diverted branch,
- the first internal heat exchanger,
- the second internal heat exchanger,
- a first part of the refrigerant fluid enters the second bypass pipe, enters the third expansion device where it experiences a drop in pressure and transitions to a low pressure, said low-pressure refrigerant fluid then circulates in the cooler,
- a second part of the refrigerant fluid enters the first expansion device, where it experiences a drop in pressure and transitions to a low pressure, the evaporator, the second expansion device through which the refrigerant fluid passes without a drop in pressure, and the evaporator/condenser, the two parts of refrigerant fluid joining back together upstream of the first internal heat exchanger, the refrigerant fluid then passes through the first internal heat exchanger before returning to the compressor,
- and wherein, in the second loop for heat-transfer fluid, the heat-transfer fluid leaving the two-fluid heat exchanger circulates in the internal radiator and gives up heat energy.

According to another aspect of the invention, the thermal management device is configured to operate in another dehumidifying mode in which the refrigerant fluid circulates in the first loop for refrigerant fluid, successively in:
- the compressor where the refrigerant fluid transitions to a high pressure,
- the two-fluid heat exchanger,
- a part of the refrigerant fluid passing through the first external radiator via the diverted branch and another part heading directly toward the first internal heat exchanger,
- the first internal heat exchanger,
- the second internal heat exchanger,
- a first part of the refrigerant fluid enters the second bypass pipe, enters the third expansion device where it experiences a drop in pressure and transitions to a low pressure, said low-pressure refrigerant fluid then circulates in the cooler,
- a second part of the refrigerant fluid enters the first expansion device, where it experiences a drop in pressure and transitions to a low pressure, the evaporator, the second expansion device through which the refrigerant fluid passes without a drop in pressure, and the evaporator/condenser, the first and second parts of refrigerant fluid joining back together upstream of the first internal heat exchanger, the refrigerant fluid then passes through the first internal heat exchanger before returning to the compressor,
- and wherein, in the second loop for heat-transfer fluid, the heat-transfer fluid leaving the two-fluid heat exchanger circulates in the internal radiator and gives up heat energy.

Other features and advantages of the invention will become more clearly apparent from reading the following description, which is given by way of illustrative and non-limiting example, and the appended drawings, in which.

Figure 2:
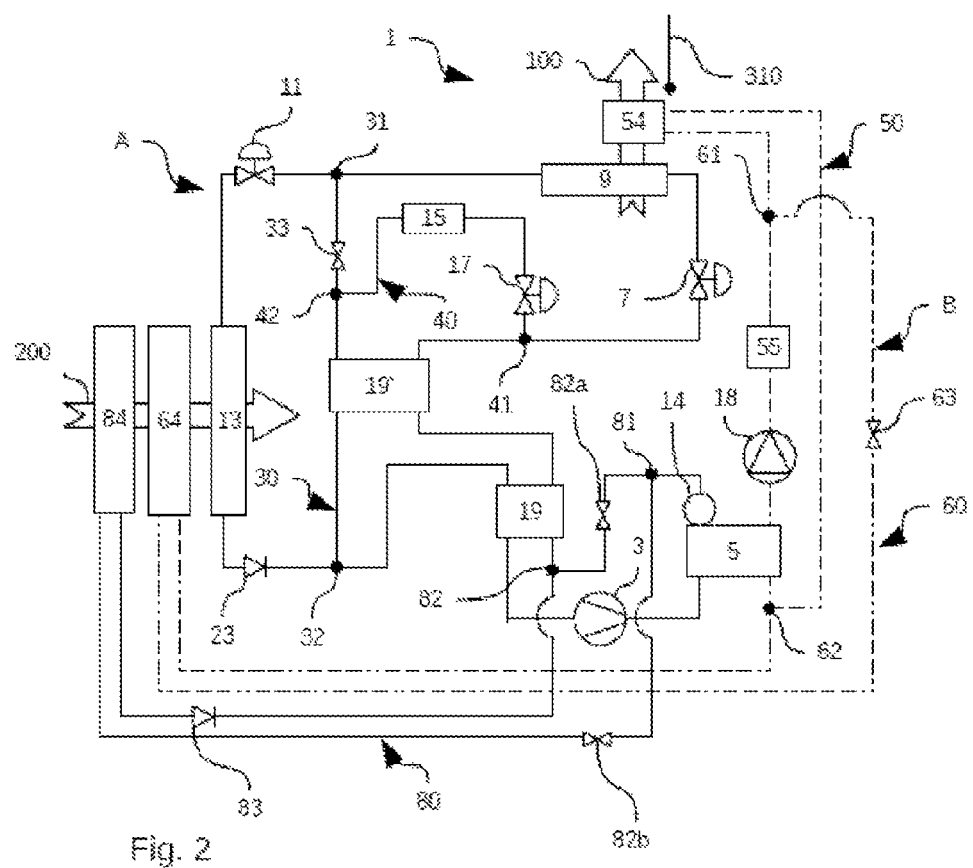
FIG. 2 is a schematic depiction of a thermal management device according to a second embodiment.
Figure 9A:
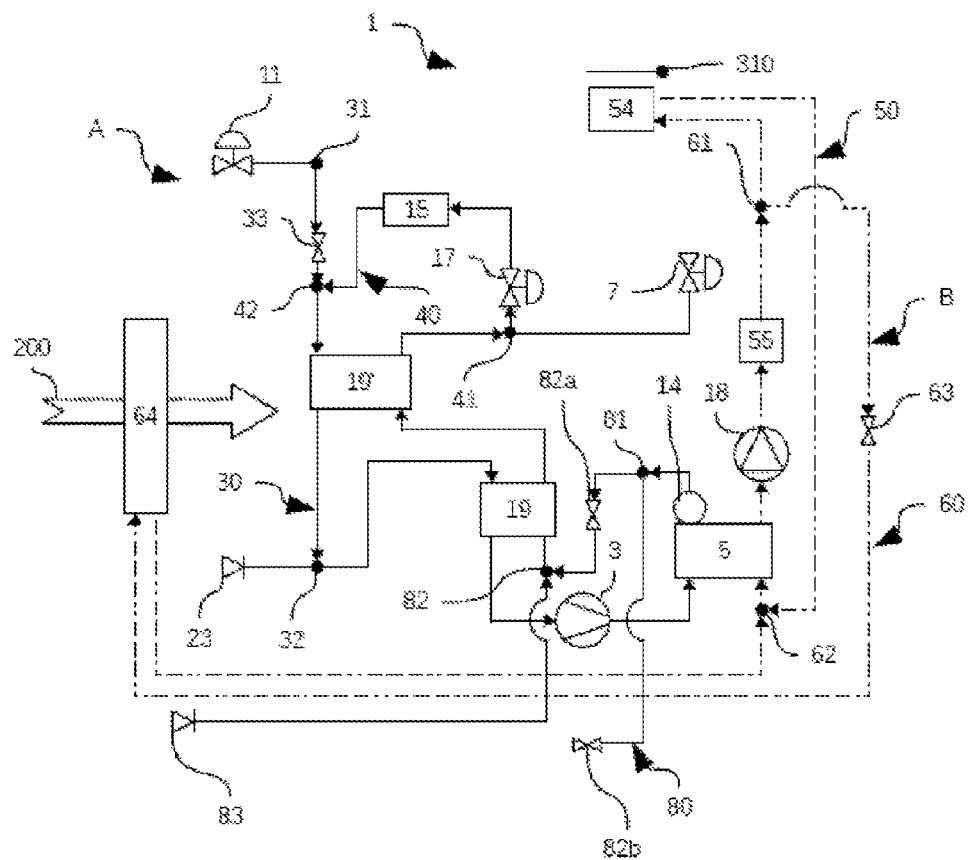
Figure 9B:
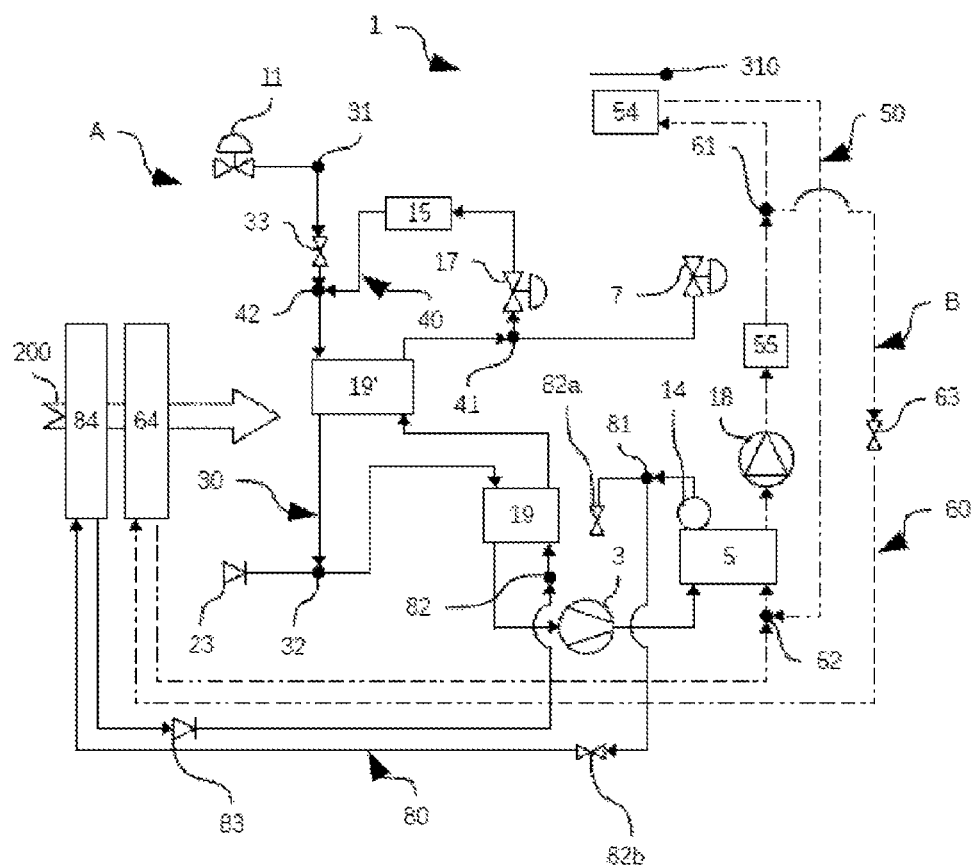
Figure 10A:
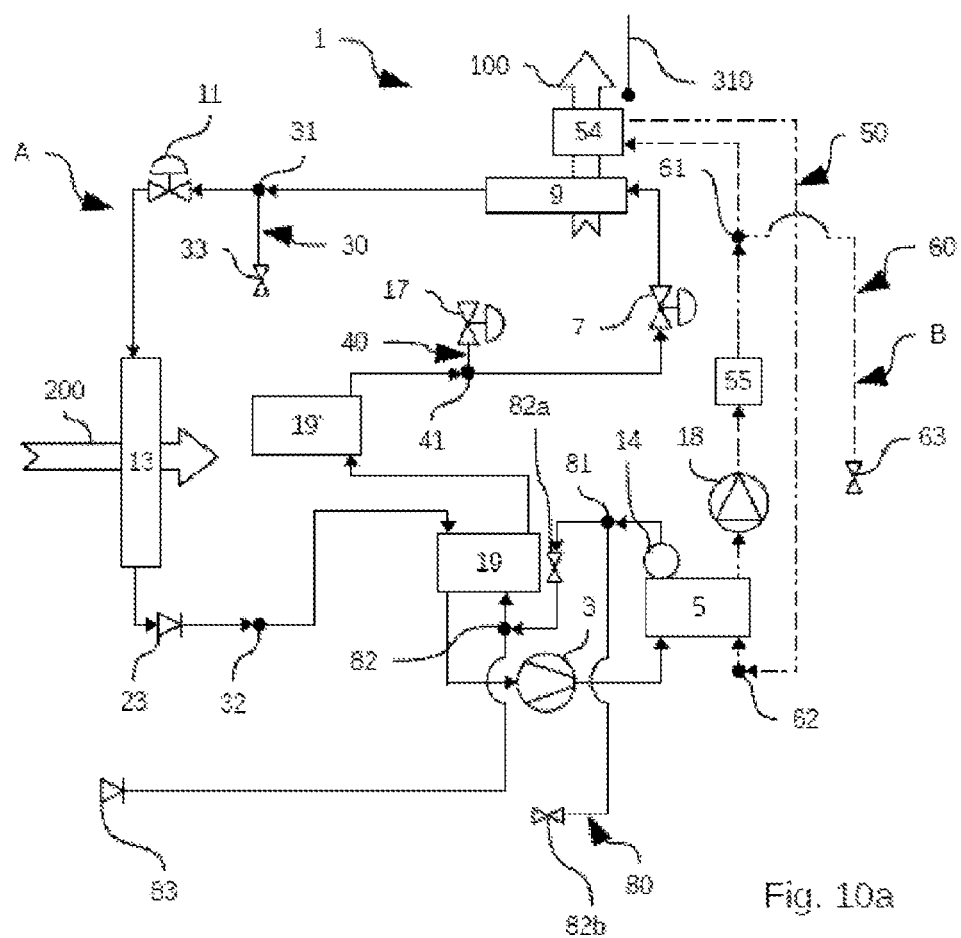
Figure 10B:
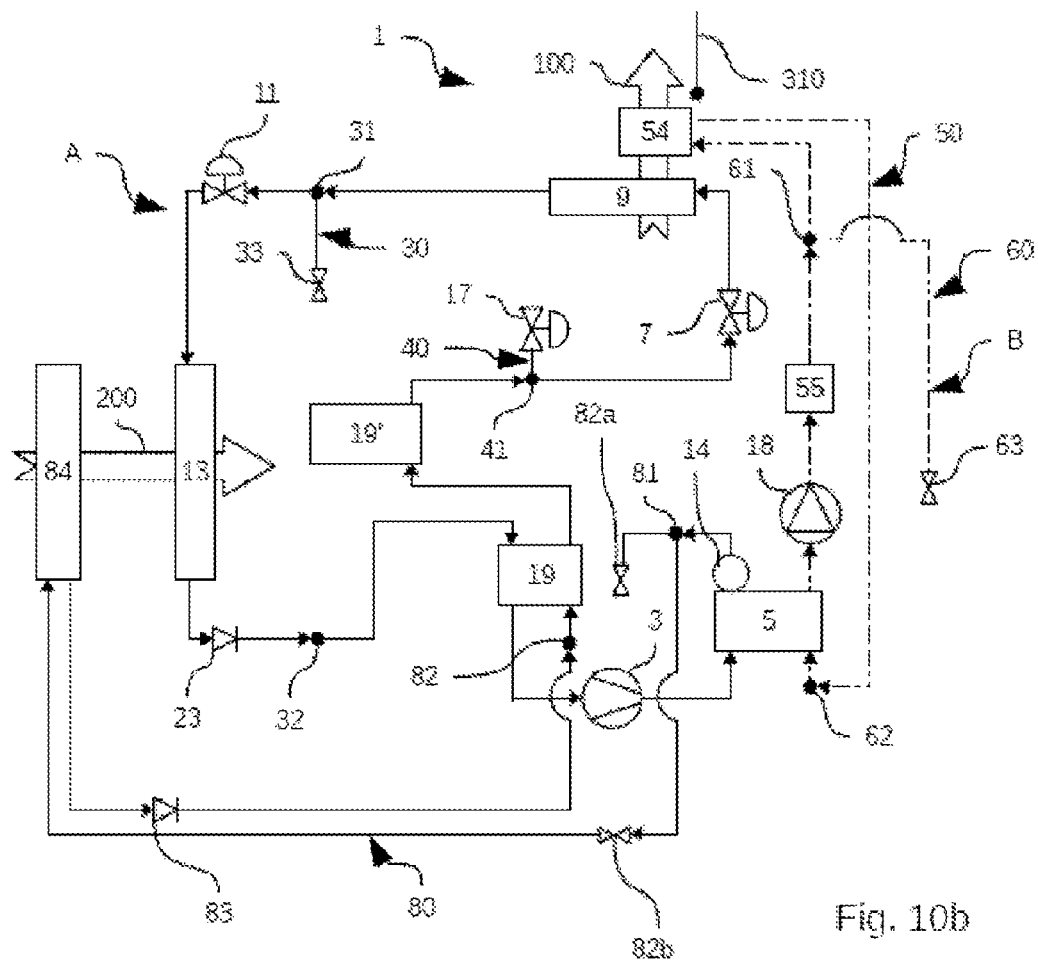
Figure 10C:
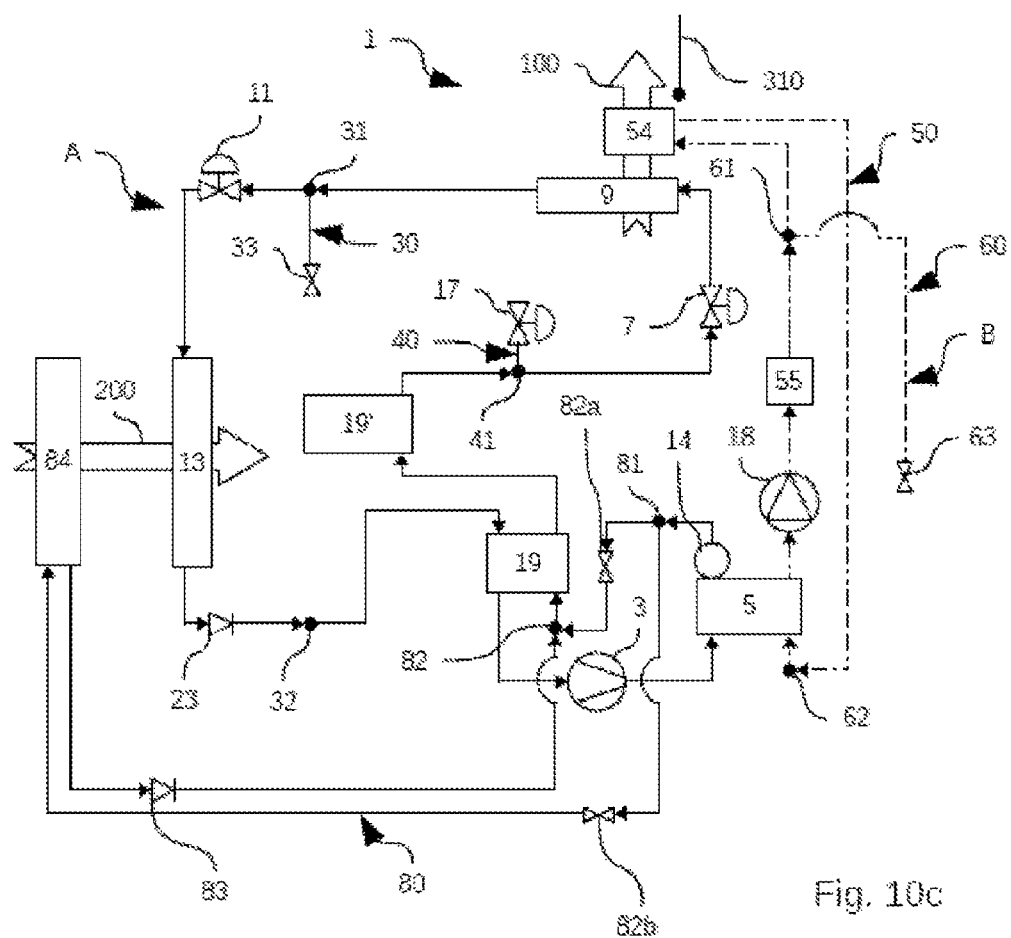

FIG. 9a is a schematic depiction of the thermal management device of FIG. 2 according to a fifth cooling mode, FIG. 9b is a schematic depiction of the thermal management device of FIG. 2 according to a sixth cooling mode, FIG. 10a is a schematic depiction of the thermal management device of FIG. 2 according to a first dehumidifying mode, FIG. 10b is a schematic depiction of the thermal management device of FIG. 2 according to a second dehumidifying mode, FIG. 10c is a schematic depiction of the thermal management device of FIG. 2 according to a third dehumidifying mode.

Figure 11A:
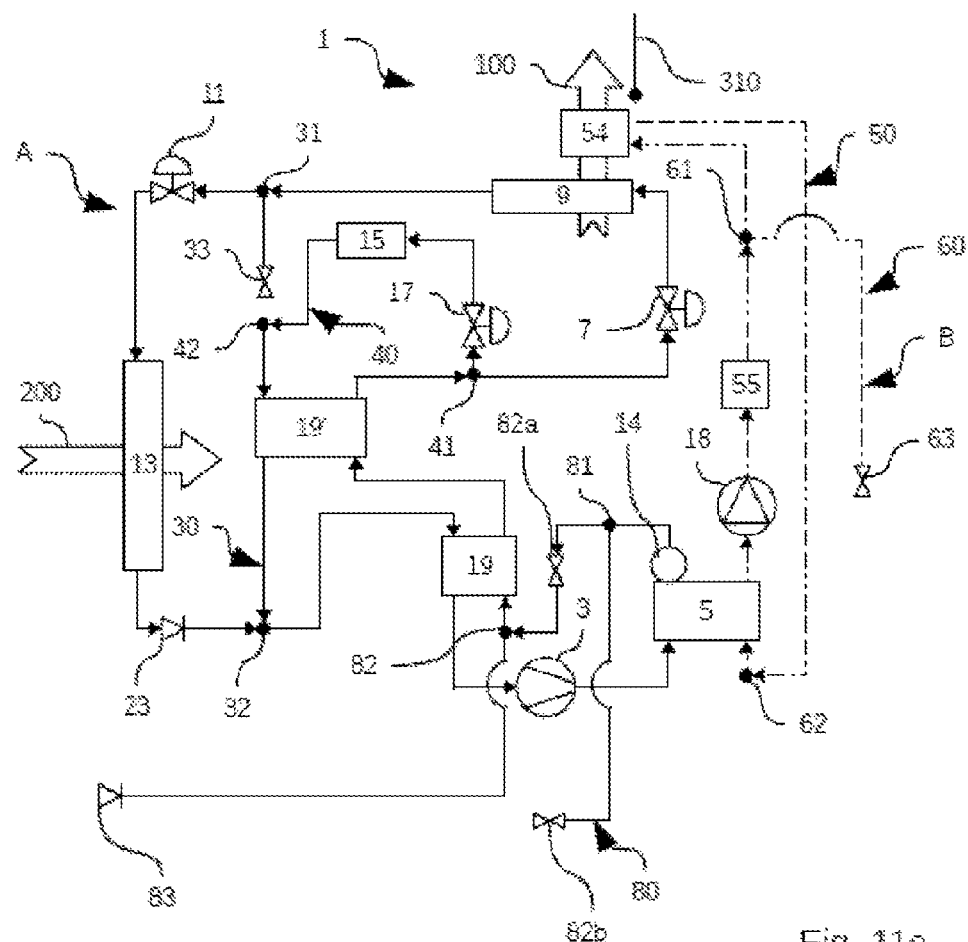
Figure 11B:
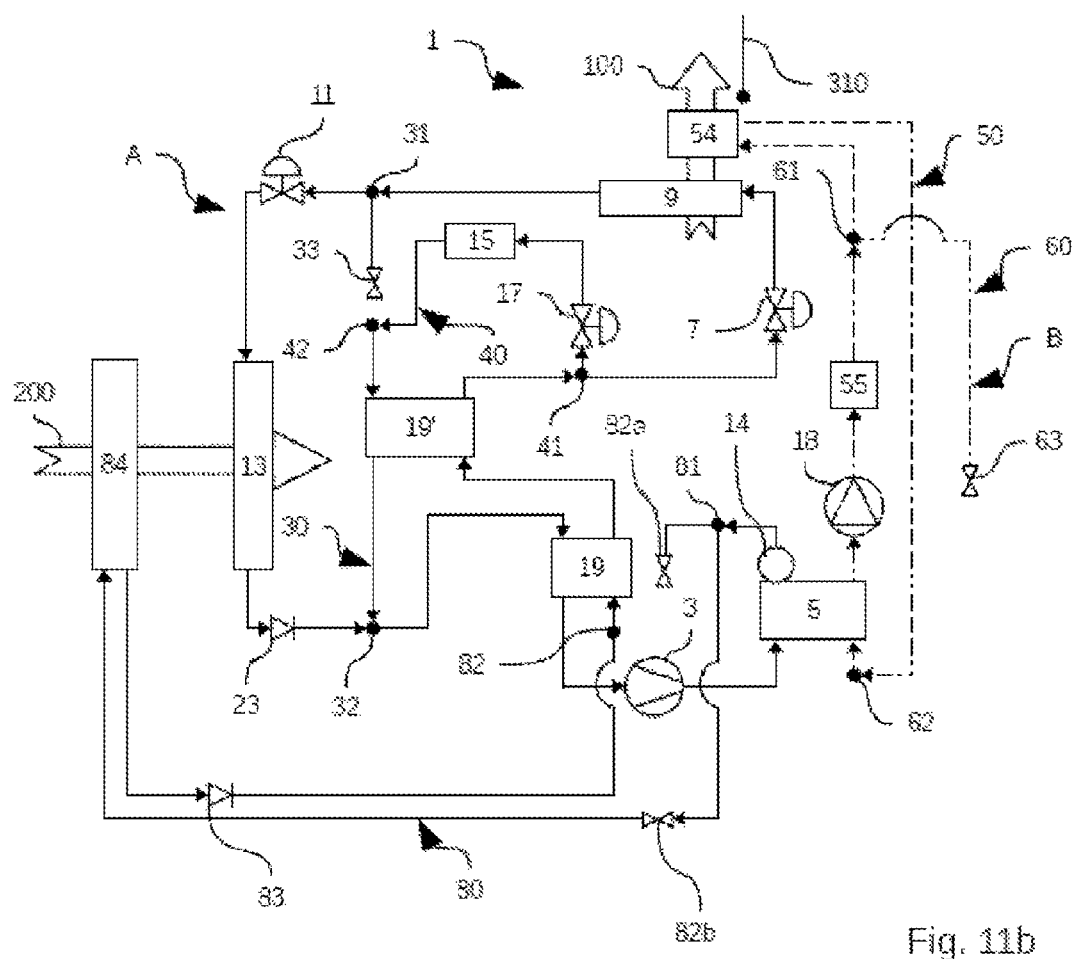
Figure 11C:
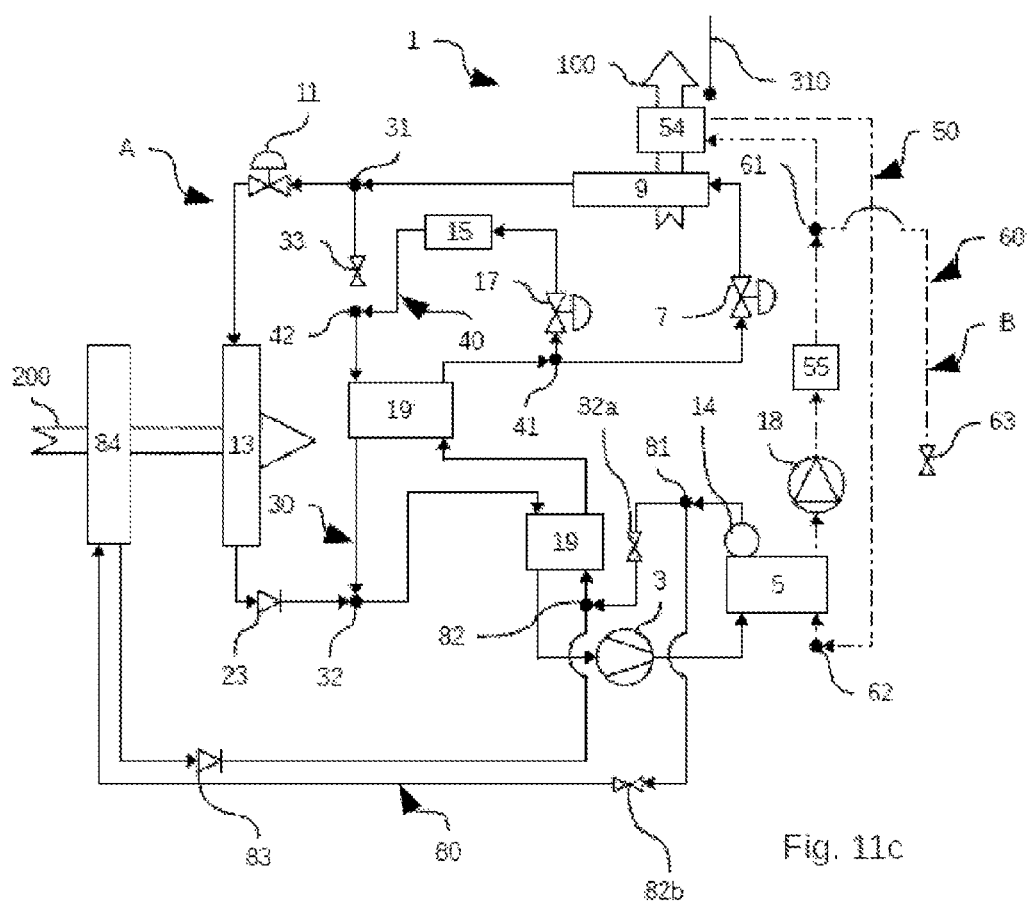

FIG. 11a is a schematic depiction of the thermal management device of FIG. 2 according to a fourth dehumidifying mode, FIG. 11b is a schematic depiction of the thermal management device of FIG. 2 according to a fifth dehumidifying mode, FIG. 11c is a schematic depiction of the thermal management device of FIG. 2 according to a sixth dehumidifying mode.

In the various figures, identical elements bear the same reference numbers.

The following embodiments are examples. Although the description refers to one or more embodiments, this does not necessarily mean that each reference relates to the same embodiment, or that the features apply only to one embodiment. Single features of different embodiments can also be combined and/or interchanged in order to create other embodiments.

In the present description, some elements or parameters can be indexed, such as, for example, first element or second element, as well as first parameter and second parameter or even first criterion and second criterion, etc. In this case, this is simple indexing for differentiating and denoting elements or parameters or criteria that are similar but not identical. This indexing does not imply any priority of one element, parameter or criterion over another and such denominations can be easily interchanged without departing from the scope of the present description. Furthermore, this indexing does not imply any chronological order, for example, in assessing any given criterion.

In the present description, "positioned upstream" is given to mean that an element is positioned before another with respect to the direction in which a fluid circulates. Conversely, "positioned downstream" is given to mean that an element is positioned after another with respect to the direction in which the fluid circulates.

Figure 1:
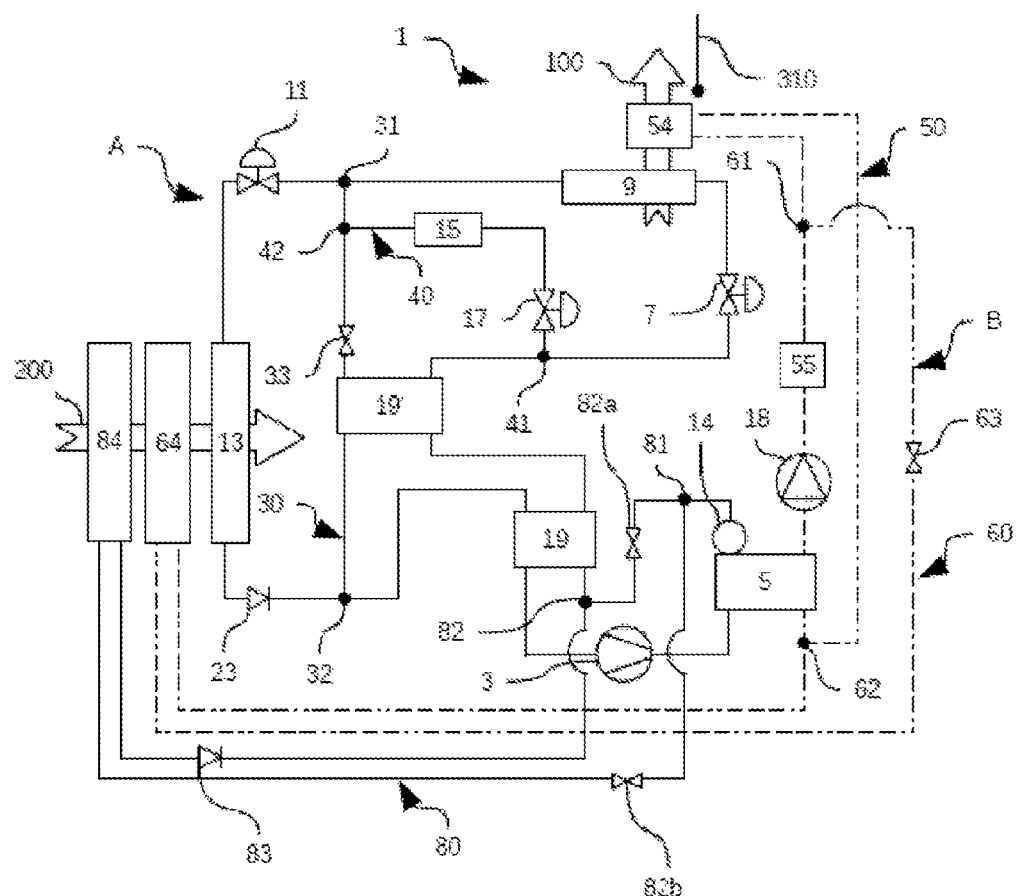
FIG. 1 is a schematic depiction of a thermal management device according to a first embodiment.

FIG. 1 shows a thermal management device comprising an indirect air-conditioning circuit 1 for a motor vehicle. This indirect air-conditioning circuit 1 notably comprises:
  a first loop for refrigerant fluid A in which a refrigerant fluid is intended to circulate.
  a second loop for heat-transfer fluid B in which a heat-transfer fluid is intended to circulate, and
  a two-fluid heat exchanger 5 arranged jointly on the first loop for refrigerant fluid A and on the second loop for heat-transfer fluid B, so as to allow exchanges of heat between said first loop for refrigerant fluid A and said second loop for heat-transfer fluid B.

The first loop for refrigerant fluid A comprises, more particularly, in the direction in which the refrigerant fluid circulates:
  a compressor 3.
  the two-fluid heat exchanger 5, positioned downstream of said compressor 3.
  a first expansion device 7,
  an evaporator 9 intended to have passing through it a flow 100 of air internal to the motor vehicle,
  a second expansion device 11,
  an evaporator/condenser 13 intended to have passing through it a flow 200 of air external to the motor vehicle, and
  a first bypass pipe 30 bypassing the evaporator/condenser 13.

What is meant here by a "radiator" is a heat exchanger of which the main function is to dissipate heat energy, in this instance into an internal 100 or external 200 air flow.

What is meant here by an "evaporator" is a heat exchanger of which the main function is to absorb heat energy, in this instance into an internal-air flow 100. Within said "evaporator", the refrigerant fluid generally transitions from a liquid phase to a gas phase or a bi-phasic mixture.

What is meant here by a "two-fluid heat exchanger" is a heat exchanger inside which the refrigerant fluid from the first loop for refrigerant fluid A and the heat-transfer fluid from the second loop for heat-transfer fluid B circulate simultaneously. The main function of this two-fluid heat exchanger is, here, to dissipate heat energy, in this instance by giving it up to the heat-transfer fluid of the second loop B. Within said two-fluid heat exchanger, the refrigerant fluid transitions from a gas phase to a liquid phase.

What is meant here by an "evaporator/condenser" is a heat exchanger equally capable of dissipating or of absorbing heat energy, in this instance in respect of an external-air flow 200.

What is meant here by an internal-air flow 100 is a flow of air intended for the interior compartment of the motor vehicle. The evaporator 9 can thus be arranged within a heating, ventilation and air-conditioning device. What is meant by an external-air flow 200 is a flow of air originating from outside of the motor vehicle. The evaporator/condenser 13 can thus be arranged on the front face of the motor vehicle.

The first bypass pipe 30 may more specifically connect a first connection point 31 and a second connection point 32.

The first connection point 31 is preferably positioned, in the direction in which the refrigerant fluid circulates, downstream of the evaporator 9, between said evaporator 9 and the evaporator/condenser 13. More particularly, and as illustrated in FIG. 1, the first connection point 31 is positioned between the evaporator 9 and the second expansion device 11. However, it is entirely possible to conceive of the first connection point 31 being positioned between the second expansion device 11 and the evaporator/condenser 13 provided that the refrigerant fluid has the possibility to bypass said second expansion device 11 or to pass through same without experiencing a pressure drop.

The second connection point 32 is itself preferably positioned downstream of the evaporator/condenser 13, between said heat exchanger 13 and the compressor 3.

In order to control whether or not the refrigerant fluid passes within the first bypass pipe 30, the latter comprises a first shut-off valve 33. In order for the refrigerant fluid not to pass through the evaporator/condenser 13, the second expansion device 11 may notably comprise a shut-off function, namely the ability to block the flow of refrigerant fluid when it is closed. An alternative may be to position a shut-off valve between the second expansion device 11 and the first connection point 31.

Another alternative (not depicted) may also be to fit a three-way valve at the first connection point 31.

The first loop for refrigerant fluid A may also comprise a non-return valve 23 positioned downstream of the evaporator/condenser 13, between said evaporator/condenser 13 and the second connection point 32 in order to prevent any reflux of refrigerant fluid coming from the first bypass pipe 30 toward the evaporator/condenser 13.

What are meant here by a shut-off valve, a non-return valve, a three-way valve or an expansion device with shut-off function are mechanical or electromechanical elements which can be self-regulating or operated by an electronic control unit carried on board the motor vehicle.

The first loop for refrigerant fluid A also comprises a first internal heat exchanger 19 (or IHX) allowing an exchange of heat between the high-pressure refrigerant fluid leaving the two-fluid heat exchanger 5 and the low-pressure refrigerant fluid leaving the evaporator/condenser 13 or leaving the first bypass pipe 30. This first internal heat exchanger 19 notably comprises an inlet and an outlet for low-pressure refrigerant fluid coming from the second connection point 32, and an inlet and an outlet for high-pressure refrigerant fluid coming from the two-fluid heat exchanger 5.

What is meant by a high-pressure refrigerant fluid is a refrigerant fluid that has undergone an increase in pressure at the compressor 3 and which has not yet experienced a pressure drop as a result of one of the expansion devices. What is meant by a low-pressure refrigerant fluid is a refrigerant fluid that has experienced a pressure drop and is at a pressure close to the pressure at the inlet of the compressor 3.

The first loop for refrigerant fluid A also comprises a second internal heat exchanger 19' (or IHX) allowing an exchange of heat between the high-pressure refrigerant fluid leaving the first internal heat exchanger 19 and the low-pressure refrigerant fluid circulating in the first bypass pipe 30. This second internal heat exchanger 19 notably comprises an inlet and an outlet for low-pressure refrigerant fluid coming from the first connection point 31, and an inlet and an outlet for high-pressure refrigerant fluid coming from the first internal heat exchanger 19. As illustrated in FIG. 1, the second internal heat exchanger 19' may be positioned downstream of the first shut-off valve 33.

Of the first 19 and second 19' internal heat exchangers, at least one may be a coaxial heat exchanger, which means to say one comprising two tubes that are coaxial and between which the exchanges of heat take place.

For preference, the first internal heat exchanger 19 may be a coaxial internal heat exchanger with a length comprised between 50 and 120 mm, whereas the second internal heat exchanger 19' may be a coaxial internal heat exchanger with a length comprised between 200 and 700 mm.

The first loop for refrigerant fluid A may also comprise a bottle of desiccant 14 positioned downstream of the two-fluid heat exchanger 5, more specifically between said two-fluid heat exchanger 5 and the first internal heat exchanger 19. Such a bottle of desiccant positioned on the high-pressure side of the air-conditioning circuit, namely downstream of the two-fluid heat exchanger 5 and upstream of an expansion device, represents less bulk and a lower cost by comparison with other phase-separation solutions such as an accumulator which would be positioned on the low-pressure side of the air-conditioning circuit, namely upstream of the compressor 3, notably upstream of the first internal heat exchanger 19.

The first 7 and second 11 expansion devices may be electronic expansion valves, namely expansion valves the outlet refrigerant fluid pressure of which is controlled by an actuator which fixes the open cross section of the expansion device, thus fixing the pressure of the fluid at outlet. Such an electronic expansion valve is notably able to allow the refrigerant fluid to pass without a pressure drop when said expansion device is fully open.

According to one preferred embodiment, the first expansion device 7 is an electronic expansion valve that can be controlled by a control unit incorporated into the vehicle, and the second expansion device 11 is a thermostatic expansion valve.

Figure 5:
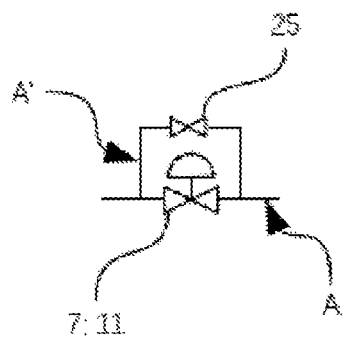
FIG. 5 shows an expansion device according to an alternative embodiment.

The second expansion device 11 may notably be a thermostatic expansion valve incorporating a shut-off function. In that case, said first 7 and second 11 expansion devices may be bypassed by a diversion pipe A', notably comprising a shut-off valve 25, as illustrated in FIG. 5. This diversion pipe A' allows the refrigerant fluid to bypass said first 7 and second 11 expansion devices without experiencing a drop in pressure. For preference, at least the second expansion device 11 is a thermostatic expansion valve comprising a diversion pipe A'. The first expansion device 7 may also comprise a shut-off function or else comprise a shut-off valve downstream of it so as to block or not block the passage of the refrigerant fluid.

The first loop for refrigerant fluid A also includes a second bypass pipe 40 bypassing the first expansion device 7 and the evaporator 9. This second bypass pipe 40 comprises a third expansion device 17 positioned upstream of a cooler 15. This cooler 15 may be arranged jointly on a secondary thermal management loop. The secondary thermal management loop may more particularly be a loop in which there circulates a heat-transfer fluid and which is connected to heat exchangers or cold plates in the region of batteries and/or electronic elements. The cooler 15 may also be a heat exchanger directly in contact with the elements that are to be cooled, such as the batteries.

The third expansion device 17 may also comprise a shut-off function so as to allow or not allow the refrigerant fluid to pass through the second bypass pipe 40. An alternative is to position a shut-off valve on the second bypass pipe 40, upstream of the third expansion device 17.

The second bypass pipe 40 is connected, on the one hand, upstream of the first expansion device 7. This connection is achieved at a third connection point 41 positioned upstream of the first expansion device 7, between the second internal heat exchanger 19' and said first expansion device 7.

According to a first embodiment illustrated in FIG. 1, the second bypass pipe 40 is connected, on the other hand, to the first bypass pipe 30, upstream of the first shut-off valve 33 and of the second internal heat exchanger 19'. This connection is achieved at a fourth connection point 42 positioned between the first connection point 31 and the first shut-off valve 33 when the latter is positioned upstream of the second internal heat exchanger 19' as in FIG. 1.

According to a second embodiment illustrated in FIG. 2, the second bypass pipe 40 is connected, on the other hand, to the first bypass pipe 30, upstream of the second internal heat exchanger 19' and downstream of the first shut-off valve 33. The fourth connection point 42 is then positioned between the first shut-off valve 33 and the second internal heat exchanger 19' when the first shut-off valve 33 is positioned upstream of the second internal heat exchanger 19' as in FIG. 2.

Figure 3:
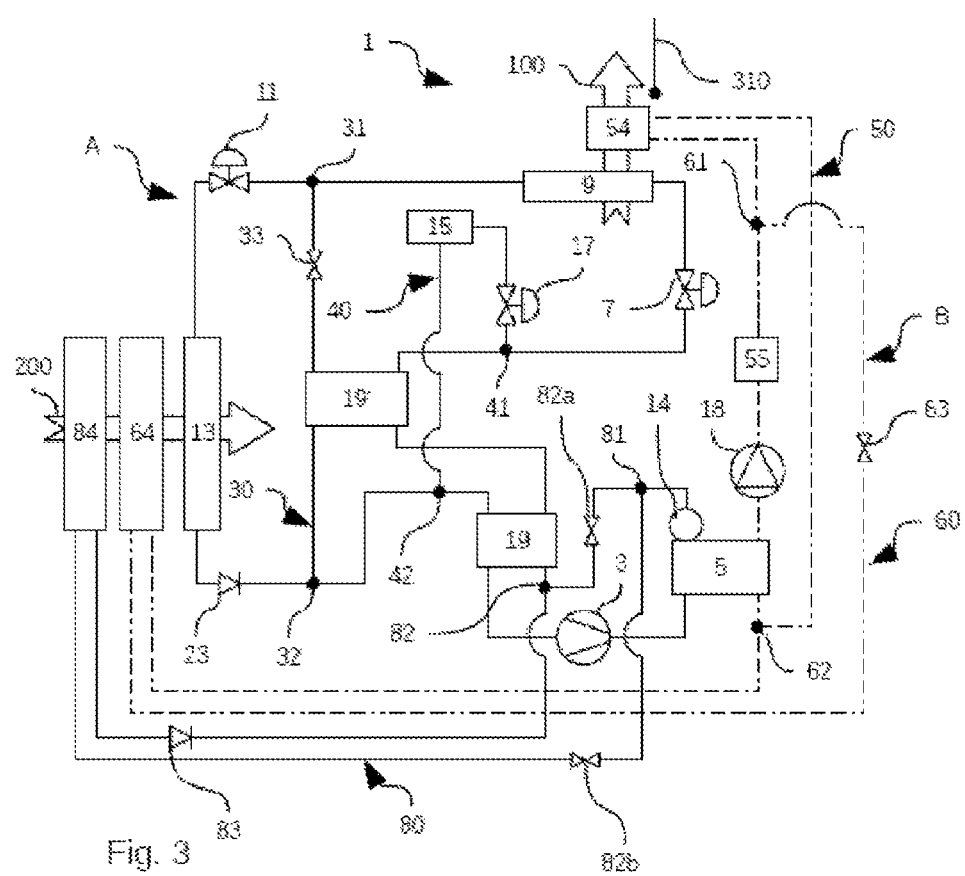
FIG. 3 is a schematic depiction of a thermal management device according to a third embodiment.

FIG. 3 shows a third embodiment in which the second bypass pipe 40 is connected, on the one hand, upstream of the first expansion device 7 and, on the other hand, downstream of the second expansion device 19', between said second expansion device 19' and the first internal heat exchanger 19. The third connection point 41 is thus also positioned upstream of the first expansion device 7, between the second internal heat exchanger 19' and said first expansion device 7.

In the example of FIG. 3, the fourth connection point 42 is positioned downstream of the first bypass pipe 30, between the second connection point 32 and the first internal heat exchanger 19. However, it is also entirely possible to conceive of the fourth connection point 42 being positioned on the first bypass pipe 30, downstream of the first shut-off valve 33 and of the second internal heat exchanger 19'.

Figure 4:
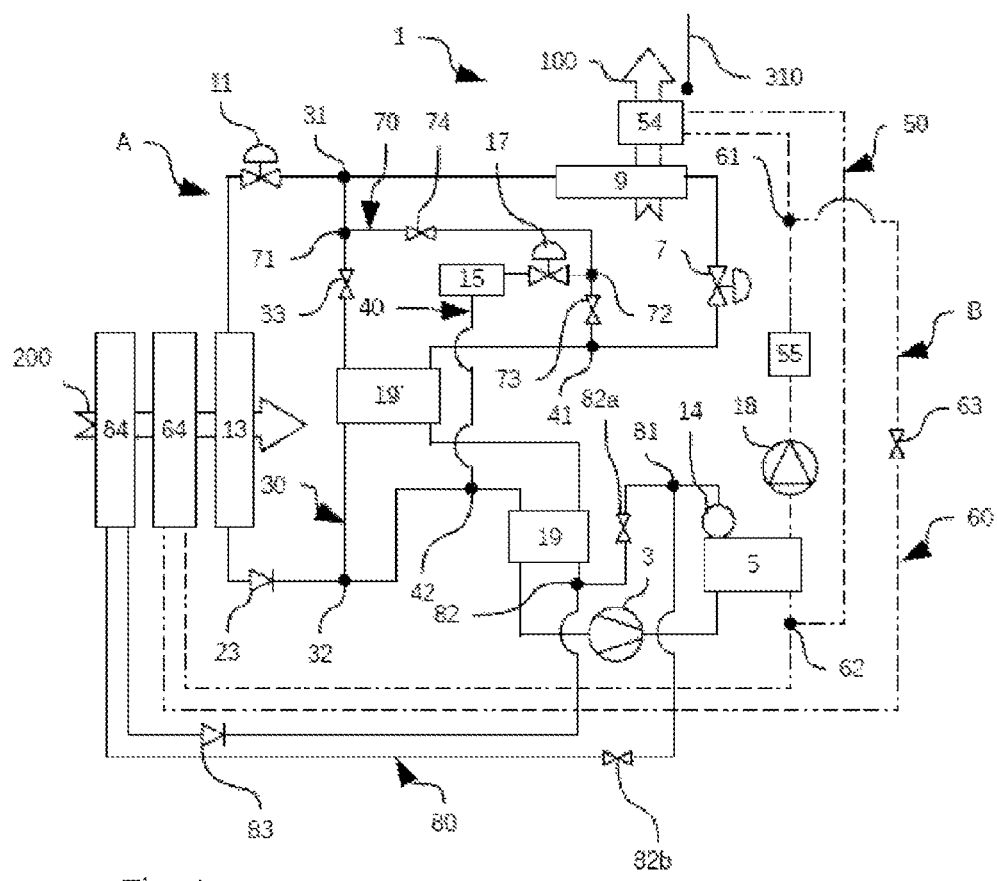
FIG. 4 is a schematic depiction of a thermal management device according to a fourth embodiment.

FIG. 4 shows a fourth embodiment identical to that of FIG. 3 except that the first loop for refrigerant fluid A comprises a diverted pipe 70 connected, on the one hand, to the first bypass pipe 30, upstream of the first shut-off valve 33 and of the second internal heat exchanger 19'. The connection is achieved by a fifth connection point 71 positioned between the first connection point 31 and the first shut-off valve 33 when the latter is positioned upstream of the second internal heat exchanger 19', as illustrated in FIG. 4.

This diverted pipe 70 is connected, on the other hand, to the second bypass pipe 40, upstream of the third expansion device 17 between said third expansion device 17 and a second shut-off valve 73. This second shut-off valve 73 is positioned between the third connection point 41 and the third expansion device 17. The connection of the diverted pipe 70 is therefore achieved at a fifth connection point 72 positioned downstream of the second shut-off valve 73. This diverted pipe 70 comprises a third shut-off valve 74 so as to allow or not allow the refrigerant fluid to pass along within it.

The first loop for refrigerant fluid A also comprises a diverted branch 80 connecting a first bifurcation 81 to a second bifurcation 82. The first bifurcation 81 is positioned downstream of the two-fluid heat exchanger, between said two-fluid heat exchanger 5 and the first internal heat exchanger 19. The second bifurcation 82 for its part is positioned upstream of the first internal heat exchanger 19, between said first internal heat exchanger 19 and the first bifurcation 81.

The diverted loop 80 comprises a first external radiator 84. This first external radiator 84 is intended to have the external-air flow 200 passing through it. The first external radiator 84 may notably be positioned on the front face of the motor vehicle, upstream of the evaporator/condenser 13. The first external radiator 84 also has the function of causing the refrigerant fluid to experience supercooling.

The first radiator 84 is thus also sometimes known as a supercooler.

The indirect air-conditioning circuit 1, and, more specifically, the first loop for refrigerant fluid A, comprises a device for redirecting the refrigerant fluid leaving the two-fluid heat exchanger 5 directly toward the first internal heat exchanger 19 and/or toward the diverted branch 80.

According to a first variant illustrated in FIGS. 1 to 4, the device for redirecting the refrigerant fluid leaving the two-fluid heat exchanger 5 may comprise:
  a first shut-off valve 82a arranged on the main loop A downstream of the first bifurcation 81, between the first 81 and the second 82 bifurcation, and
  a second shut-off valve 82b arranged on the diverted branch 80 downstream of the first bifurcation 81, between the first bifurcation 81 and the first external radiator 84.

According to a second variant which has not been depicted, the device for redirecting the refrigerant fluid leaving the two-fluid heat exchanger 5 comprises a three-way valve arranged at the first bifurcation 81.

The diverted branch 80 may also comprise a non-return valve 83 positioned downstream of the first external radiator 84, between said first external radiator 84 and the second bifurcation 82. This non-return valve 83 is positioned so as to block the refrigerant fluid coming from the second bifurcation 82.

The second loop for heat-transfer fluid B may itself comprise:
  the two-fluid heat exchanger 5,
  a first heat-transfer fluid circulation pipe 50 comprising an internal radiator 54 intended to have passing through it a flow 100 of air internal to the motor vehicle, and connecting a first junction point 61 positioned downstream of the two-fluid heat exchanger 5 and a second junction point 62 positioned upstream of said two-fluid heat exchanger 5,
  a second heat-transfer fluid circulation pipe 60 comprising a second external radiator 64 intended to have passing through it a flow 200 of air external to the motor vehicle, and connecting the first junction point 61 positioned downstream of the two-fluid heat exchanger 5 and the second junction point 62 positioned upstream of said two-fluid heat exchanger 5, and
  a pump 18 positioned downstream or upstream of the two-fluid heat exchanger 5, between the first junction point 61 and the second junction point 62.

The internal radiator 54 can thus be arranged within the heating, ventilation and air-conditioning device. As a preference, the radiator 54 is positioned downstream of the evaporator in the direction of circulation of the internal-air flow 100. The second external radiator 64 may for its part be positioned on the front face of the motor vehicle, for example upstream of the evaporator/condenser 13 in the direction in which the external-air flow 200 circulates, more specifically between the first external radiator 84 and the evaporator/condenser 13.

The indirect reversible air-conditioning circuit 1 comprises, within the second loop for heat-transfer fluid B, a device for redirecting the heat-transfer fluid coming from the two-fluid heat exchanger 5 toward the first circulation pipe 50 and/or toward the second circulation pipe 60.

As illustrated in FIGS. 1 to 4, said device for redirecting the heat-transfer fluid coming from the two-fluid heat exchanger 5 may notably comprise a fourth shut-off valve 63 positioned on the second circulation pipe 60 so as to block or not block the heat-transfer fluid and prevent it from circulating in said second circulation pipe 60.

The thermal management device may also comprise, within the heating, ventilation and air-conditioning device, a flap 310 for obstructing the internal-air flow 100 passing through the internal radiator 54.

This embodiment notably makes it possible to limit the number of valves in the second loop for heat-transfer fluid B, thus making it possible to limit production costs.

Figure 6:
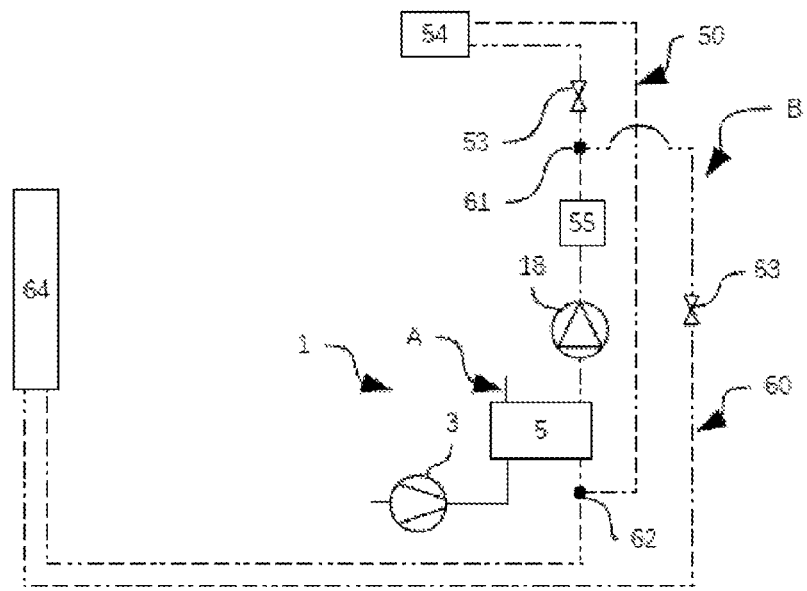
FIG. 6 is a schematic depiction of the second loop for heat-transfer fluid of the thermal management device of FIGS. 1 to 4, according to an alternative embodiment.

According to one alternative embodiment illustrated in FIG. 6, the device for redirecting the heat-transfer fluid coming from the two-fluid heat exchanger 5 may notably comprise:
  a fourth shut-off valve 63 positioned on the second circulation pipe 60 in order to block or not block the heat-transfer fluid and prevent it from circulating in said second circulation pipe 60, and
  a fifth shut-off valve 53 positioned on the first circulation pipe 50 in order to block or not block the heat-transfer fluid and prevent it from circulating in said first circulation pipe 50.

The second loop for heat-transfer fluid B may also comprise an electric heating element 55 for heating the heat-transfer fluid. Said electric heating element 55 is notably positioned, in the direction in which the heat-transfer fluid circulates, downstream of the two-fluid heat exchanger 5, between said two-fluid heat exchanger 5 and the first junction point 61.

The present invention also relates to a set of methods for operating the thermal management device according to various modes of operation illustrated in FIGS. 7a to 11c. In these FIGS. 7a to 11c, only the elements in which the refrigerant fluid and/or the heat-transfer fluid circulate(s) are depicted. The direction of circulation of the refrigerant fluid and/or the heat-transfer fluid is indicated using arrows. The examples illustrated in FIGS. 7a to 11c all show the first loop for refrigerant fluid A and more particularly the connection of the second bypass pipe 40 according to the embodiment of FIG. 2. However, it is entirely possible to conceive of the modes of operation described hereinbelow for the embodiments of FIGS. 1, 3 and 4.

Figure 7A:
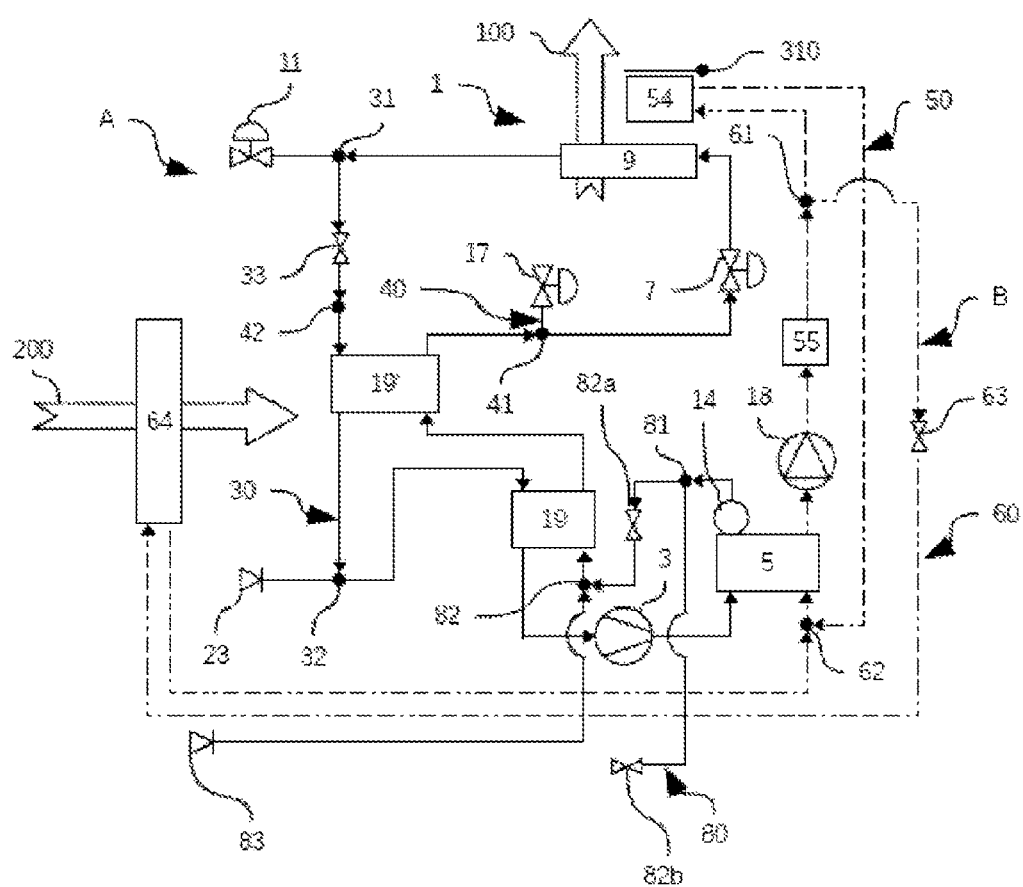
FIG. 7a is a schematic depiction of the thermal management device of FIG. 2 according to a first cooling mode.

1. First Cooling Mode:

FIG. 7a shows a first cooling mode in which, in the first loop for refrigerant fluid A, the refrigerant fluid circulates successively in:

the compressor 3 where the refrigerant fluid transitions to a high pressure, the two-fluid heat exchanger 5, in which the refrigerant fluid gives up heat energy to the heat-transfer fluid of the second loop for heat-transfer fluid B, the first internal heat exchanger 19, the second internal heat exchanger 19', the first expansion device 7 where the refrigerant fluid experiences a pressure drop and transitions to a low pressure, the evaporator 9, in which the refrigerant fluid absorbs heat energy from the internal-air flow 100, cooling same, the first bypass pipe 30 where the refrigerant fluid enters the second internal heat exchanger 19', and the first internal heat exchanger 19 before returning to the compressor 3.

In the second loop for heat-transfer fluid B, the heat-transfer fluid leaving the two-fluid heat exchanger 5 circulates in the second external radiator 64 of the second circulation pipe 60.

As illustrated in the example of FIG. 7a, a portion of the heat-transfer fluid leaving the two-fluid heat exchanger 5 circulates in the internal radiator 54 of the first circulation pipe 50 and another portion of the heat-transfer fluid leaving the two-fluid heat exchanger 5 circulates in the second external radiator 64 of the second circulation pipe 60. The blanking flap 310 is closed so as to prevent the internal-air flow 100 from circulating in the internal radiator 54.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at constant pressure.

The high-pressure refrigerant fluid does not enter the diverted branch 80 because the device for redirecting the refrigerant fluid leaving the two-fluid heat exchanger 5 redirects the refrigerant fluid directly toward the first heat exchanger 19. For that, in the example illustrated in FIG. 7a, the first shut-off valve 82a of said device is open and the second shut-off valve 82b of said device is closed.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', the refrigerant fluid does not circulate in the second bypass pipe 40 because the third expansion device 17 is closed.

The refrigerant fluid then passes through the first expansion device 7 in which it experiences a pressure drop and transitions to a low pressure.

The low-pressure refrigerant fluid then enters the evaporator 9 where it gains heat energy while cooling the internal-air flow 100. The refrigerant fluid transitions back to the gaseous state. On leaving the evaporator 9, the refrigerant fluid is redirected toward the first bypass pipe 30. In order that the refrigerant fluid does not enter the evaporator/condenser 13, the second expansion device 11 is closed.

The low-pressure refrigerant fluid then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

This first cooling mode is useful for cooling the internal-air flow 100.

In this first cooling mode, the two internal heat exchangers 19 and 19' are active and their effects combine. The use of the internal heat exchangers 19 and 19' one after the other makes it possible to lower the enthalpy of the refrigerant fluid entering the first expansion device 7. The refrigerant fluid in the liquid state leaving the two-fluid heat exchanger 5 is cooled by the refrigerant fluid in the gaseous state and at low pressure leaving the evaporator 9. The difference in enthalpy across the terminals of the evaporator 9 increases appreciably, allowing both an increase in the cooling power available at said evaporator 9 which cools the air flow 100, thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid picks up heat energy coming from the refrigerant fluid at the two-fluid heat exchanger 5.

As illustrated in FIG. 7a, a portion of the heat-transfer fluid circulates in the first circulation pipe 50 and passes through the internal radiator 54. The heat-transfer fluid does not, however, lose heat energy because the blanking flap 310 is closed and blocks off the internal-air flow 100 so that it does not pass through the internal radiator 54.

Another portion of the heat-transfer fluid circulates in the second circulation pipe 60 and passes through the second external radiator 64. The heat-transfer fluid loses heat energy at said second external radiator 64 by releasing it into the external-air flow 200. The fourth shut-off valve 63 is open so as to allow the heat-transfer fluid to pass.

An alternative solution (not depicted) for stopping the heat-transfer fluid from exchanging with the internal-air flow 100 at the internal radiator 54 is to equip the first circulation pipe 50 with the fifth shut-off valve 53 as in FIG. 6 and to close this valve so as to prevent the heat-transfer fluid from circulating in said first circulation pipe 50.

Figure 7B:
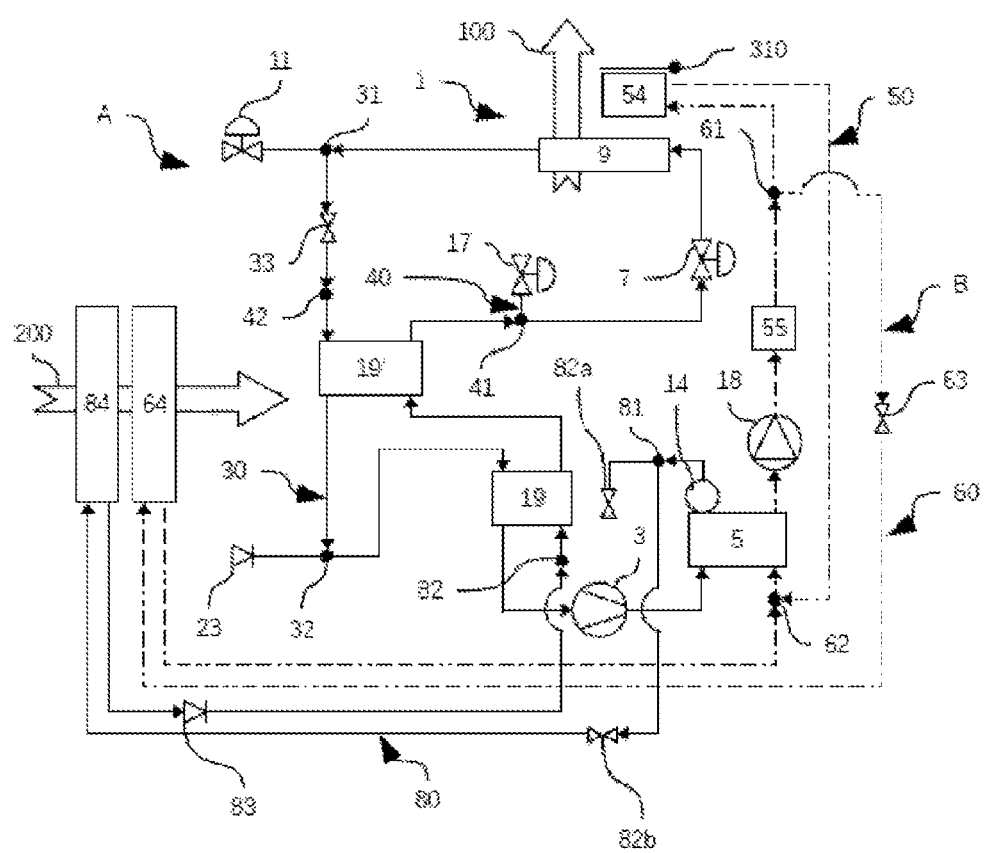
FIG. 7b is a schematic depiction of the thermal management device of FIG. 2 according to a second cooling mode.

2. Second Cooling Mode:

FIG. 7b shows a second cooling mode. This second cooling mode is identical to the first cooling mode of FIG. 7a, except that on leaving the two-fluid heat exchanger 5, the refrigerant fluid passes through the diverted branch 80 and the first external radiator 84. For that, the device for redirecting the refrigerant fluid leaving the two-fluid heat exchanger 5 redirects the refrigerant fluid directly toward the first external radiator 84 and not toward the first internal heat exchanger 19. For that, in the example illustrated in FIG. 7b, the first shut-off valve 82a of said device is closed and the second shut-off valve 82b of said device is open.

In the first external radiator 84, the refrigerant fluid gives up heat energy to the external-air flow 200. That allows the removal of more heat than can be removed by means of the third radiator 64 alone. This is particularly beneficial when the needs for cooling via the evaporator 9 are high. The first external radiator 84 also makes available an additional surface area for exchange with the external-air flow 200. That allows the temperature (and therefore the enthalpy) of the refrigerant fluid to be reduced before it enters the first internal heat exchanger 19 in order to improve the cooling performance of the system.

Figure 8A:
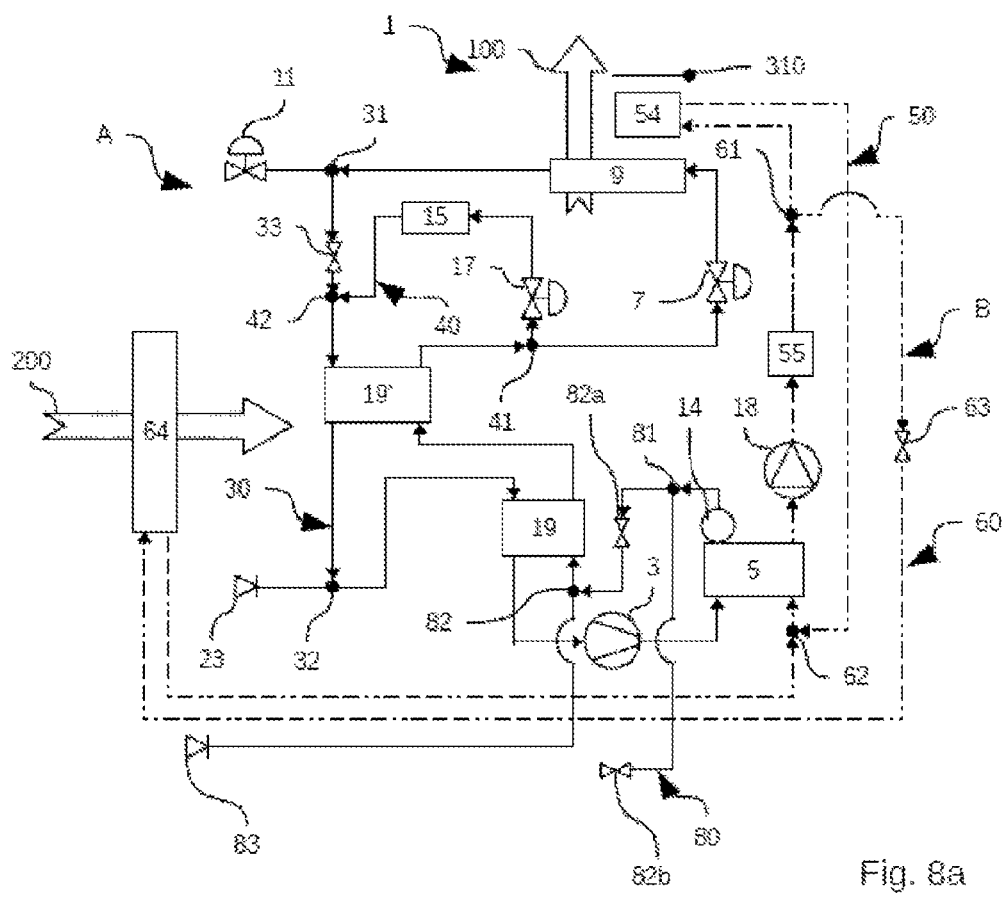
FIG. 8a is a schematic depiction of the thermal management device of FIG. 2 according to a third cooling mode.

3. Third Cooling Mode:

FIG. 8a shows a third cooling mode in which, in the first loop for refrigerant fluid A, the refrigerant fluid circulates successively in:

- the compressor 3 where the refrigerant fluid transitions to a high pressure.
- the two-fluid heat exchanger 5, in which the refrigerant fluid gives up heat energy to the heat-transfer fluid of the second loop for heat-transfer fluid B,
- the first internal heat exchanger 19,
- the second internal heat exchanger 19',
- a first part of the refrigerant fluid enters the second bypass pipe 40, enters the third expansion device 17 where it experiences a drop in pressure and transitions to a low pressure, said low-pressure refrigerant fluid then circulates in the cooler 15,
- a second part of the refrigerant fluid enters the first expansion device 7, where it experiences a drop in pressure and transitions to a low pressure, the evaporator 9, where it picks up heat energy from the internal-air flow 100 cooling the latter, and enters the first bypass pipe 30.

The two parts of the refrigerant fluid then come back together at the first bypass pipe 30 upstream of the second internal heat exchanger 19' in the example of FIG. 8a. The refrigerant fluid then enters the second internal heat exchanger 19', and the first internal heat exchanger 19, before returning to the compressor 3.

Whatever the embodiment of the connection of the second bypass pipe 40 illustrated by FIGS. 1 to 4, the two parts of the refrigerant fluid come back together again upstream of the first internal heat exchanger 19. The refrigerant fluid thus passes at least through the first internal heat exchanger 19 before reaching the compressor 3.

In the second loop for heat-transfer fluid B, the heat-transfer fluid leaving the two-fluid heat exchanger 5 circulates in the second external radiator 64 of the second circulation pipe 50.

As illustrated in FIG. 8a, a proportion of the heat-transfer fluid leaving the two-fluid heat exchanger 5 circulates through the internal radiator 54 of the first circulation pipe 50 and another proportion of the heat-transfer fluid leaving the two-fluid heat exchanger 5 circulates through the second external radiator 64 of the second circulation pipe 50. The blanking flap 310 is closed so as to prevent the internal-air flow 100 from circulating in the internal radiator 54.

The refrigerant fluid entering the compressor 3 is in the gaseous phase. The refrigerant fluid undergoes a compression phase as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at constant pressure.

The high-pressure refrigerant fluid does not enter the diverted branch 80 because the device for redirecting the refrigerant fluid leaving the two-fluid heat exchanger 5 redirects the refrigerant fluid directly toward the first heat exchanger 19. For that, in the example illustrated in FIG. 7a, the first shut-off valve 82a of said device is open and the second shut-off valve 82b of said device is closed.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', a first pan of the refrigerant fluid enters the second bypass pipe 40, and a second part of the refrigerant fluid heads toward the first expansion device 7.

The first part of the refrigerant fluid enters the third expansion device 17. The high-pressure refrigerant fluid experiences an isenthalpic pressure drop and transitions to a state of a biphasic mixture. The refrigerant fluid is now said to be at low pressure.

The low-pressure refrigerant fluid then enters the cooler 15 where it gains heat energy at the cooler 15. The refrigerant fluid transitions back to the gaseous state. On leaving the cooler 15, the refrigerant fluid reaches the first bypass pipe 30. In the example illustrated in FIG. 8a, the refrigerant fluid reaches the first bypass pipe 30 upstream of the first shut-off valve 33 and of the second internal heat exchanger 19'.

On leaving the second internal heat exchanger 19', a second part of the high-pressure refrigerant fluid enters the first expansion device 7. The high-pressure refrigerant fluid experiences an isenthalpic pressure drop and transitions to a state of a biphasic mixture. The refrigerant fluid is now said to be at low pressure.

The low-pressure refrigerant fluid then enters the evaporator 9 where it gains heat energy while cooling the internal-air flow 100. The refrigerant fluid transitions back to the gaseous state. On leaving the evaporator 9, the refrigerant fluid is redirected toward the first bypass pipe 30. In order that the refrigerant fluid does not enter the evaporator/condenser 13, the second expansion device 11 is closed.

The low-pressure refrigerant fluid coming both from the evaporator 9 and from the second bypass pipe 40 then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

This third cooling mode is beneficial for cooling the internal-air flow 100 and for cooling the elements such as batteries and/or electronic elements that are cooled directly or indirectly by the cooler 15.

In this third cooling mode, the two internal heat exchangers 19 and 19' are active both in respect of the refrigerant fluid coming from the evaporator 9 and the refrigerant fluid passing through the second bypass pipe 40, and their effects combine. The use of the internal heat exchangers 19 and 19' one after the other makes it possible to lower the heat energy of the refrigerant fluid entering the first expansion device 7. The refrigerant fluid in the liquid state leaving the two-fluid heat exchanger 5 is cooled by the refrigerant fluid in the gaseous state and at low pressure leaving the evaporator 9 and the cooler 15. The difference in heat energy across the terminals of these two heat exchangers increases appreciably, allowing both an increase in the cooling power available at said evaporator 9 and at the cooler 15, this in turn thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid picks up heat energy coming from the refrigerant fluid at the two-fluid heat exchanger 5.

As illustrated in the example of FIG. 8a, a portion of the heat-transfer fluid circulates in the first circulation pipe 50 and passes through the internal radiator 54. The heat-transfer fluid does not, however, lose heat energy because the blanking flap 310 is closed and blocks off the internal-air flow 100 so that it does not pass through the internal radiator 54.

Another portion of the heat-transfer fluid circulates in the second circulation pipe 60 and passes through the second external radiator 64. The heat-transfer fluid loses enthalpy at said second external radiator 64 by releasing it into the external-air flow 200. The fourth shut-off valve 63 is open so as to allow the heat-transfer fluid to pass.

An alternative solution (not depicted) for stopping the heat-transfer fluid from exchanging with the internal-air flow 100 at the internal radiator 54 is to equip the first circulation pipe 50 with the fifth shut-off valve 53 as in FIG. 6 and to close this valve so as to prevent the heat-transfer fluid from circulating in said first circulation pipe 50.

Figure 8B:
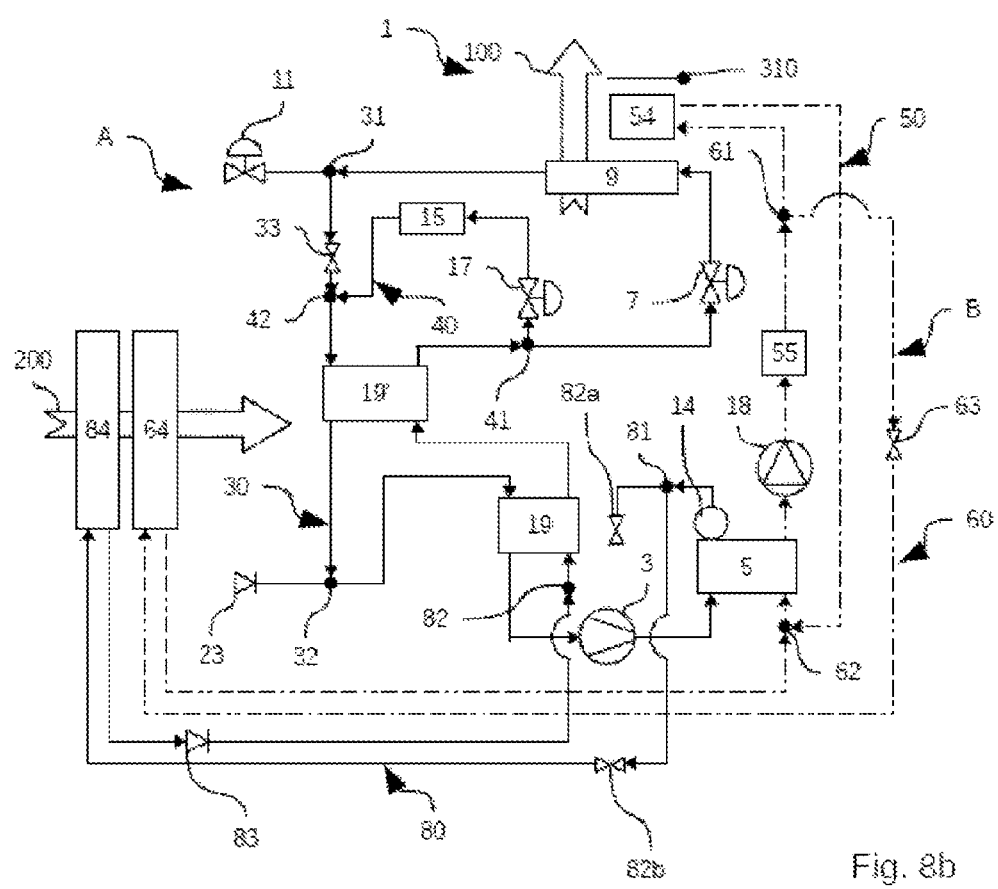
FIG. 8b is a schematic depiction of the thermal management device of FIG. 2 according to a fourth cooling mode.

4. Fourth Cooling Mode:

FIG. 8b shows a fourth cooling mode. This fourth cooling mode is identical to the third cooling mode of FIG. 8a, except that on leaving the two-fluid heat exchanger 5, the refrigerant fluid passes through the diverted branch 80 and the first external radiator 84. For that, the device for redirecting the refrigerant fluid leaving the two-fluid heat exchanger 5 redirects the refrigerant fluid directly toward the first external radiator 84 and not toward the first internal heat exchanger 19. For that, in the example illustrated in FIG. 8b, the first shut-off valve 82a of said device is closed and the second shut-off valve 82b of said device is open.

In the first external radiator 84, the refrigerant fluid gives up heat energy to the external-air flow 200. That allows the removal of more heat than can be removed by means of the third radiator 64 alone. This is particularly beneficial when the exterior temperature is high and the needs for cooling are high notably when a great deal of heat energy is absorbed at the cooler 15 and simply removing the heat energy using the second radiator 64 will not suffice, for example during rapid discharging or charging of the batteries of an electric or hybrid vehicle while at the same time maintaining a cooling of the internal-air flow 100 for comfort.

5. Fifth Cooling Mode:

FIG. 9a shows a fifth cooling mode in which, in the first loop for refrigerant fluid, the refrigerant fluid circulates successively in:
- the compressor 3 where the refrigerant fluid transitions to a high pressure,
- the two-fluid heat exchanger 5, in which the refrigerant fluid gives up heat energy to the heat-transfer fluid of the second loop for heat-transfer fluid B,
- the first internal heat exchanger 19,
- the second internal heat exchanger 19',
- the second bypass pipe 40, in which the refrigerant fluid enters the third expansion device 17 where it experiences a drop in pressure and transitions to a low pressure, said low-pressure refrigerant fluid then circulates in the cooler 15,
- at least the first internal heat exchanger 19 before returning to the compressor 3.

In the example of FIG. 9a, the second bypass pipe 40 is connected to the first bypass pipe 30 upstream of the second internal heat exchanger 19'. The refrigerant fluid enters the second 19' and then the first 19 internal heat exchanger before returning to the compressor 3.

In the second loop for heat-transfer fluid B, the heat-transfer fluid leaving the two-fluid heat exchanger 5 circulates in the second external radiator 64 of the second circulation pipe 50.

As illustrated in FIG. 9a, a portion of the heat-transfer fluid leaving the two-fluid heat exchanger 5 circulates in the internal radiator 54 of the first circulation pipe 50 and another portion of the heat-transfer fluid leaving the two-fluid heat exchanger 5 circulates in the second external radiator 64 of the second circulation pipe 50. The blanking flap 310 is closed so as to prevent the internal-air flow 100 from circulating in the internal radiator 54.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of this heat energy to the heat-transfer fluid of the second loop for heat-transfer fluid B. The high-pressure refrigerant fluid therefore loses heat energy while remaining at constant pressure.

The high-pressure refrigerant fluid does not enter the diverted branch 80 because the device for redirecting the refrigerant fluid leaving the two-fluid heat exchanger 5 redirects the refrigerant fluid directly toward the first heat exchanger 19. For that, in the example illustrated in FIG. 7a, the first shut-off valve 82a of said device is open and the second shut-off valve 82b of said device is closed.

The high-pressure refrigerant fluid then enters the first internal heat exchanger 19 where it loses heat energy. This heat energy is transferred to the low-pressure refrigerant fluid coming from the first bypass pipe 30.

The high-pressure refrigerant fluid then enters the second internal heat exchanger 19' where it once again loses heat energy. This heat energy is transferred to the low-pressure refrigerant fluid passing through the first bypass pipe 30.

On leaving the second internal heat exchanger 19', the refrigerant fluid does not reach the evaporator 9 because the first expansion device 7 is closed. The refrigerant fluid enters the second bypass pipe 40.

The refrigerant fluid enters the third expansion device 17. The high-pressure refrigerant fluid experiences an isenthalpic pressure drop and transitions to a state of a biphasic mixture. The refrigerant fluid is now said to be at low pressure.

The low-pressure refrigerant fluid then enters the cooler 15 where it gains heat energy at the cooler 15. The refrigerant fluid transitions back to the gaseous state. On leaving the cooler 15, the refrigerant fluid reaches the first bypass pipe 30. In the example illustrated in FIG. 9*a*, the refrigerant fluid reaches the first bypass pipe 30 upstream of the first shut-off valve 33 and of the second internal heat exchanger 19. In order that the refrigerant fluid does not enter the evaporator/condenser 13, the second expansion device 11 or the first shut-off valve 33 is closed, depending on the embodiment of the second bypass pipe 40.

The low-pressure refrigerant fluid then enters the second internal heat exchanger 19' where it gains heat energy coming from the high-pressure refrigerant fluid passing through the second internal heat exchanger 19'.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

This cooling mode is beneficial for cooling the elements such as batteries and/or electronic elements that are cooled directly or indirectly by the cooler 15.

In this fifth cooling mode, the two internal heat exchangers 19 and 19' are active both in respect of the refrigerant fluid coming from the evaporator 9 and the refrigerant fluid passing through the second bypass pipe 40, and their effects combine. The use of the internal heat exchangers 19 and 19' one after the other makes it possible to lower the heat energy of the refrigerant fluid entering the first expansion device 7. The refrigerant fluid in the liquid state leaving the two-fluid heat exchanger 5 is cooled by the refrigerant fluid in the gaseous state and at low pressure leaving the evaporator 9 and the cooler 15. The difference in heat energy across the terminals of these two heat exchangers increases appreciably, allowing both an increase in the cooling power available at said evaporator 9 and at the cooler 15, this in turn thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

In the second loop for heat-transfer fluid B, the heat-transfer fluid picks up heat energy coming from the refrigerant fluid at the two-fluid heat exchanger 5.

As illustrated in the example of FIG. 9*a*, a portion of the heat-transfer fluid circulates in the first circulation pipe 50 and passes through the internal radiator 54. The heat-transfer fluid does not, however, lose heat energy because the blanking flap 310 is closed and blocks off the internal-air flow 100 so that it does not pass through the internal radiator 54.

Another portion of the heat-transfer fluid circulates in the second circulation pipe 60 and passes through the second external radiator 64. The heat-transfer fluid loses enthalpy at said second external radiator 64 by releasing it into the external-air flow 200. The fourth shut-off valve 63 is open so as to allow the heat-transfer fluid to pass.

An alternative solution (not depicted) for stopping the heat-transfer fluid from exchanging with the internal-air flow 100 at the internal radiator 54 is to equip the first circulation pipe 50 with the fifth shut-off valve 53 as in FIG. 6 and to close this valve so as to prevent the heat-transfer fluid from circulating in said first circulation pipe 50.

6. Sixth Cooling Mode:

FIG. 9*b* shows a sixth cooling mode. This sixth cooling mode is identical to the fifth cooling mode of FIG. 9*a*, except that on leaving the two-fluid heat exchanger 5, the refrigerant fluid passes through the diverted branch 80 and the first external radiator 84. For that, the device for redirecting the refrigerant fluid leaving the two-fluid heat exchanger 5 redirects the refrigerant fluid directly toward the first external radiator 84 and not toward the first internal heat exchanger 19. For that, in the example illustrated in FIG. 9*b*, the first shut-off valve 82*a* of said device is closed and the second shut-off valve 82*b* of said device is open.

In the first external radiator 84, the refrigerant fluid gives up heat energy to the external-air flow 200. That allows the removal of more heat than can be removed by means of the third radiator 64 alone. This is particularly beneficial when a great deal of heat energy is absorbed at the cooler 15 and simply removing the heat energy using the second radiator 64 will not suffice, for example during rapid discharging or charging of the batteries of an electric or hybrid vehicle.

7. First Dehumidifying Mode:

FIG. 10*a* shows a first dehumidifying mode in which, in the first loop for refrigerant fluid, the refrigerant fluid circulates successively in:

the compressor 3 where the refrigerant fluid transitions to a high pressure.

the two-fluid heat exchanger 5, in which the refrigerant fluid gives up heat energy to the heat-transfer fluid of the second loop for heat-transfer fluid B, the first internal heat exchanger 19, the second internal heat exchanger 19', the first expansion device 7 where the refrigerant fluid experiences a pressure drop and transitions to a low pressure, the evaporator 9, in which the refrigerant fluid absorbs heat energy from the internal-air flow 100, cooling same.

the second expansion device 11 through which the refrigerant fluid passes without a drop in pressure, the evaporator/condenser 13, in which the refrigerant fluid absorbs heat energy from the external-air flow 200, and the first internal heat exchanger 19 before returning to the compressor 3.

In the second loop for heat-transfer fluid B, the heat-transfer fluid circulates in the internal radiator 54 and gives up heat energy to the internal-air flow 100.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of enthalpy to the heat-transfer fluid of the second loop for heat-transfer fluid B. The high-pressure refrigerant fluid therefore loses heat energy while remaining at constant pressure.

The high-pressure refrigerant fluid then enters the first internal heat exchanger 19 where it loses heat energy. This heat energy is transferred to the low-pressure refrigerant fluid coming from the evaporator/condenser 13.

The high-pressure refrigerant fluid then enters the second internal heat exchanger 19' where it does not lose heat energy because there is no circulation of low-pressure refrigerant fluid in said second internal heat exchanger 19'.

As illustrated in FIG. 10a, on leaving the second internal heat exchanger 19', the refrigerant fluid does not circulate in the second bypass pipe 40 because the third expansion device 17 is closed.

The high-pressure refrigerant fluid enters the first expansion device 7. The high-pressure refrigerant fluid experiences an isenthalpic pressure drop and transitions to a state of a biphasic mixture. The refrigerant fluid is now said to be at low pressure.

The refrigerant fluid then passes through the evaporator 9 where it absorbs heat energy while cooling the internal-air flow 100.

On leaving the evaporator 9, the refrigerant fluid is redirected toward the evaporator/condenser 13. For that, the first shut-off valve 33 of the first bypass pipe is closed. Before reaching the evaporator/condenser 13, the refrigerant fluid enters the first expansion device 11 through which it passes without a drop in pressure.

The low-pressure refrigerant fluid then passes through the evaporator/condenser 13 where it absorbs heat energy from the external-air flow 200. The refrigerant fluid thus transitions back to the gaseous state.

The low-pressure refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

In this first dehumidifying mode, only the first internal heat exchanger 19 is active. Because the heat energy of the low-pressure refrigerant fluid entering the compressor 3 is higher, the heat energy of the high-pressure refrigerant fluid leaving the compressor 3 will likewise be higher than the heat energy of the refrigerant fluid when there is no internal heat exchanger.

In addition, the addition of heat energy to the low-pressure refrigerant fluid at the first internal heat exchanger 19 makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5. The effect of the first internal heat exchanger 19 is limited because its length is comprised between 50 and 120 mm. This size makes it possible to limit the exchanges of heat between the high-pressure refrigerant fluid and the low-pressure refrigerant fluid so that the heat energy exchanged makes it possible to limit the proportion of refrigerant fluid in the liquid phase before it enters the compressor 3 without at the same time penalizing the effectiveness of the heat-pump mode. Specifically, the purpose of this heat-pump mode is to release as much heat energy as possible into the internal-air flow 100 in order to warm same at the evaporator 9. This heat energy, in this first dehumidifying mode, comes from the external-air flow 200 via the evaporator/condenser 13.

In the second loop for heat-transfer fluid B, the heat-transfer fluid gains heat energy coming from the refrigerant fluid at the two-fluid heat exchanger 5.

As illustrated in FIG. 10a, the heat-transfer fluid circulates in the first circulation pipe 50 and passes through the internal radiator 54. The heat-transfer fluid loses heat energy by warming the internal-air flow 100. For that, the blanking flap 310 is opened and/or the fifth shut-off valve 53 is opened. The fourth shut-off valve 63 is itself closed in order to prevent the heat-transfer fluid from passing into the second circulation pipe 60.

This first dehumidifying mode is beneficial for dehumidifying the internal-air flow 100 using cooling at the evaporator 9, which allows the moisture to condense, and then by warming the internal-air flow 100 at the internal radiator 54.

In addition, the electric heating element 55 can be in operation in order to provide an additional supply of heat energy to the heat-transfer fluid in order to warm the internal-air flow 100.

8. Second Dehumidifying Mode:

FIG. 10b shows a second dehumidifying mode. This second dehumidifying mode is identical to the first dehumidifying mode of FIG. 10a, except that on leaving the two-fluid heat exchanger 5, the refrigerant fluid passes through the diverted branch 80 and the first external radiator 84. For that, the device for redirecting the refrigerant fluid leaving the two-fluid heat exchanger 5 redirects the refrigerant fluid directly toward the first external radiator 84 and not toward the first internal heat exchanger 19. For that, in the example illustrated in FIG. 10b, the first shut-off valve 82a of said device is closed and the second shut-off valve 82b of said device is open.

In the first external radiator 84, the refrigerant fluid gives up heat energy to the external-air flow 200. That allows the removal of more heat than can be removed by means of the internal radiator 54 alone. This is particularly beneficial when a great deal of heat energy is absorbed at the evaporator 9 and at the evaporator/condenser 13 and removing the heat energy using the internal radiator 54 will not suffice.

9. Third Dehumidifying Mode:

FIG. 10c shows a third dehumidifying mode. This third dehumidifying mode is identical to the first dehumidifying mode of FIG. 10a, except that on leaving the two-fluid heat exchanger 5, a first part of the refrigerant fluid passes through the diverted branch 80 and the first external radiator 84, and a second part of the refrigerant fluid passes directly to the first internal heat exchanger 19. For that, the device for redirecting the refrigerant fluid leaving the two-fluid heat exchanger 5 redirects the refrigerant fluid both toward the first internal heat exchanger 19 and toward the first external radiator 84. For that, in the example illustrated in FIG. 10c, the first shut-off valve 82a of said device is open and the second shut-off valve 82b of said device is open.

In the first external radiator 84, the refrigerant fluid gives up heat energy to the external-air flow 200. That allows the removal of more heat than can be removed by means of the internal radiator 54 alone. This is particularly beneficial when a great deal of heat energy is absorbed at the evaporator 9 and at the evaporator/condenser 13 and removing the heat energy using the internal radiator 54 will not suffice.

10. Fourth Dehumidifying Mode:

FIG. 11a shows a second dehumidifying mode in which, in the first loop for refrigerant fluid, the refrigerant fluid circulates successively in:
  the compressor 3 where the refrigerant fluid transitions to a high pressure,
  the two-fluid heat exchanger 5, in which refrigerant fluid gives up heat energy to the heat-transfer fluid of the second loop for heat-transfer fluid B,
  the first internal heat exchanger 19,
  the second internal heat exchanger 19',
  a first part of the refrigerant fluid enters the second bypass pipe 40, enters the third expansion device 17 where it experiences a drop in pressure and transitions to a low pressure, said low-pressure refrigerant fluid then circulates in the cooler 15.
  a second part of the refrigerant fluid enters the first expansion device 7, where it experiences a drop in pressure and transitions to a low pressure, the evaporator 9, where it picks up heat energy from the internal-air flow 100, cooling the latter, the second expansion device 11 through which the refrigerant fluid passes without a drop in pressure, the evaporator/condenser 13 where the refrigerant fluid picks up heat energy from the external-air flow 200.

The two parts of refrigerant fluid join back together upstream of the first internal heat exchanger 19. In the example of FIG. 11a, the refrigerant fluid leaving the cooler 15 passes through the second bypass pipe 30 and enters the second internal heat exchanger 19.

The refrigerant fluid next enters the first internal heat exchanger 19 before returning to the compressor 3.

Whatever the embodiment of the connection of the second bypass pipe 40 illustrated by FIGS. 1 to 4, the two parts of the refrigerant fluid join back together upstream of the first internal heat exchanger 19.

In the second loop for heat-transfer fluid B, the heat-transfer fluid circulates in the internal radiator 54 and gives up heat energy to the internal-air flow 100.

The refrigerant fluid entering the compressor 3 is in the gaseous phase. The refrigerant fluid undergoes a compression as it passes through the compressor 3. Said refrigerant fluid is then said to be at high pressure.

The high-pressure refrigerant fluid passes through the two-fluid heat exchanger 5 and experiences a drop in heat energy because of its transition to the liquid phase and because of the transfer of enthalpy to the heat-transfer fluid of the second loop for heat-transfer fluid B. The high-pressure refrigerant fluid therefore loses heat energy while remaining at constant pressure.

The high-pressure refrigerant fluid then enters the first internal heat exchanger 19 where it loses heat energy. This heat energy is transferred to the low-pressure refrigerant fluid coming from the evaporator/condenser 13.

The high-pressure refrigerant fluid then enters the second internal heat exchanger 19' where it does not lose heat energy because there is no circulation of low-pressure refrigerant fluid in said second internal heat exchanger 19'.

As illustrated in FIG. 11a, on leaving the second internal heat exchanger 19', the refrigerant fluid circulates both in the second bypass pipe 40 and toward the evaporator 9.

A first part of the high-pressure refrigerant fluid enters the third expansion device 17. The high-pressure refrigerant fluid experiences an isenthalpic pressure drop and transitions to a state of a biphasic mixture. The refrigerant fluid is now said to be at low pressure.

The low-pressure refrigerant fluid then enters the cooler 15 where it gains heat energy at the cooler 15. The refrigerant fluid transitions back to the gaseous state. On leaving the cooler 15, the refrigerant fluid reaches the first bypass pipe 30. In the example illustrated in FIG. 11a, the refrigerant fluid reaches the first bypass pipe 30 upstream of the first shut-off valve 33 and of the second internal heat exchanger 19'. In order that the refrigerant fluid does not enter the evaporator/condenser 13, the second expansion device 11 or the first shut-off valve 33 is closed, depending on the embodiment of the second bypass pipe 40.

The low-pressure refrigerant fluid then enters the second internal heat exchanger 19' where it gains heat energy coming from the high-pressure refrigerant fluid passing through the second internal heat exchanger 19'.

A second part of the high-pressure refrigerant fluid enters the first expansion device 7. The high-pressure refrigerant fluid experiences an isenthalpic pressure drop and transitions to a state of a biphasic mixture. The refrigerant fluid is now said to be at low pressure.

The refrigerant fluid then passes through the evaporator 9 where it absorbs heat energy while cooling the internal-air flow 100.

On leaving the evaporator 9, the refrigerant fluid is redirected toward the evaporator/condenser 13. For that, the first shut-off valve 33 of the first bypass pipe is closed. Before reaching the evaporator/condenser 13, the refrigerant fluid enters the first expansion device 11 through which it passes without a drop in pressure.

The low-pressure refrigerant fluid then passes through the evaporator/condenser 13 where it absorbs heat energy from the external-air flow 200. The refrigerant fluid thus transitions back to the gaseous state.

The two parts of low-pressure refrigerant fluid join back together upstream of the first internal heat exchanger 19. The refrigerant fluid then enters the first internal heat exchanger 19 where it once again gains heat energy coming from the high-pressure refrigerant fluid passing through the first internal heat exchanger 19. The low-pressure refrigerant fluid then returns to the compressor 3.

In this fourth dehumidifying mode illustrated in FIG. 11a, the two internal heat exchangers 19 and 19' are active both in respect of the refrigerant fluid coming from the evaporator 9 and the refrigerant fluid passing through the second bypass pipe 40, and their effects combine. The use of the internal heat exchangers 19 and 19' one after the other makes it possible to lower the heat energy of the refrigerant fluid entering the first expansion device 7. The refrigerant fluid in the liquid state leaving the two-fluid heat exchanger 5 is cooled by the refrigerant fluid in the gaseous state and at low pressure leaving the evaporator 9 and the cooler 15. The difference in heat energy across the terminals of these two heat exchangers increases appreciably, allowing both an increase in the cooling power available at said evaporator 9 and at the cooler 15, this in turn thus improving the coefficient of performance (COP).

In addition, the addition of heat energy to the low-pressure refrigerant fluid at the first 19 and second 19' internal heat exchangers makes it possible to limit the proportion of refrigerant fluid in the liquid phase before it enters the compressor 3, notably when the air-conditioning circuit 1 comprises a bottle of desiccant 14 positioned downstream of the two-fluid heat exchanger 5.

However, the second internal heat exchanger 19' may not be active if the second bypass pipe 40 is connected downstream of said second internal heat exchanger 19' as in the embodiments of FIGS. 3 and 4.

In the second loop for heat-transfer fluid B, the heat-transfer fluid picks up heat energy coming from the refrigerant fluid at the two-fluid heat exchanger 5.

As illustrated in FIG. 11a, the heat-transfer fluid circulates in the first circulation pipe 50 and passes through the internal radiator 54. The heat-transfer fluid loses heat energy by warming the internal-air flow 100. For that, the blanking flap 310 is opened and/or the fifth shut-off valve 53 is opened. The fourth shut-off valve 63 is itself closed in order to prevent the heat-transfer fluid from passing into the second circulation pipe 60.

This fourth dehumidifying mode is beneficial for dehumidifying the internal-air flow 100 using cooling at the evaporator 9, which allows the moisture to condense, and then by warming the internal-air flow 100 at the internal radiator 54. Heat energy is also recovered at the cooler 15 in order to warm the internal-air flow 100 using the internal radiator 54.

In addition, the electric heating element 55 can be in operation in order to provide an additional supply of heat energy to the heat-transfer fluid in order to warm the internal-air flow 100.

11. Fifth Dehumidifying Mode:

FIG. 11b shows a fifth dehumidifying mode. This fifth dehumidifying mode is identical to the fourth dehumidifying mode of FIG. 11a, except that on leaving the two-fluid heat exchanger 5, the refrigerant fluid passes through the diverted branch 80 and the first external radiator 84. For that, the device for redirecting the refrigerant fluid leaving the two-fluid heat exchanger 5 redirects the refrigerant fluid directly toward the first external radiator 84 and not toward the first internal heat exchanger 19. For that, in the example illustrated in FIG. 11b, the first shut-off valve 82a of said device is closed and the second shut-off valve 82b of said device is open.

In the first external radiator 84, the refrigerant fluid gives up heat energy to the external-air flow 200. That allows the removal of more heat than can be removed by means of the internal radiator 54 alone. This is particularly beneficial when a great deal of heat energy is absorbed at the evaporator 9, at the evaporator/condenser 13, and at the cooler 15, and removing the heat energy using the internal radiator 54 will not suffice.

12. Sixth Dehumidifying Mode:

FIG. 11c shows a sixth dehumidifying mode. This sixth dehumidifying mode is identical to the fourth dehumidifying mode of FIG. 11a, except that on leaving the two-fluid heat exchanger 5, a first part of the refrigerant fluid passes through the diverted branch 80 and the first external radiator 84, and a second part of the refrigerant fluid passes directly to the first internal heat exchanger 19. For that, the device for redirecting the refrigerant fluid leaving the two-fluid heat exchanger 5 redirects the refrigerant fluid both toward the first internal heat exchanger 19 and toward the first external radiator 84. For that, in the example illustrated in FIG. 10b, the first shut-off valve 82a of said device is open and the second shut-off valve 82b of said device is open.

In the first external radiator 84, the refrigerant fluid gives up heat energy to the external-air flow 200. That allows the removal of more heat than can be removed by means of the internal radiator 54 alone. This is particularly beneficial when a great deal of heat energy is absorbed at the evaporator 9, at the evaporator/condenser 13, and at the cooler 15, and removing the heat energy using the internal radiator 54 will not suffice.

Other modes of operation such as heat pump modes, and modes for deicing or recovering heat from the cooler 15 may also be envisioned with such an architecture of the thermal management device.

Thus, it may be clearly seen that, because of its architecture and particularly because of the presence of the diverted branch 80 and of the first external radiator 84, the thermal management device is able to dissipate a greater quantity of heat energy. This is particularly beneficial when a great deal of cooling power is demanded of the cooler 15, for example during rapid discharging or charging of the batteries of an electric or hybrid vehicle.

| Modes of operation | FIG.: | Function: |
|---|---|---|
| 1. First cooling mode | 7a | Cooling of the internal-air flow 100 via the evaporator 9 and removal of heat energy via the second external radiator 64. |
| 2. Second cooling mode | 7b | Cooling of the internal-air flow 100 via the evaporator 9 and removal of heat energy via the first 84 and second 64 external radiators. |
| 3. Third cooling mode | 8a | Cooling of the internal-air flow 100 via the evaporator 9 and cooling of elements such as batteries via the cooler 15. Removal of heat energy via the second external radiator 64. |
| 4. Fourth cooling mode | 8b | Cooling of the internal-air flow 100 via the evaporator 9 and cooling of elements such as batteries via the cooler 15. Removal of heat energy via the first 84 and second 64 external radiators. |
| 5. Fifth cooling mode | 9a | Cooling of elements such as batteries via the cooler 15. Removal of heat energy via the second external radiator 64. |
| 6. Sixth cooling mode | 9b | Cooling of elements such as batteries via the cooler 15. Removal of heat energy via the first 84 and second 64 external radiators. |
| 7. First dehumidifying mode | 10a | Dehumidification of the internal-air flow 100 via the evaporator 9 and the internal radiator 54. Absorption of heat energy of the external-air flow 200 via the evaporator/condenser 13. |
| 8. Second dehumidifying mode | 10b | Dehumidification of the internal-air flow 100 via the evaporator 9 and the internal radiator 54. Absorption of heat energy of the external-air flow 200 via the evaporator/condenser 13. Removal of some of the heat energy via the first external radiator 84 connected in series. |
| 9. Third dehumidifying mode | 10c | Dehumidification of the internal-air flow 100 via the evaporator 9 and the internal radiator 54. Absorption of heat energy of the external-air flow 200 via the evaporator/condenser 13. Removal of some of the heat energy via the first external radiator 84 connected in parallel. |
| 10. Fourth dehumidifying mode | 11a | Dehumidification of the internal-air flow 100 via the evaporator 9 and the internal radiator 54. Cooling of elements such as batteries via the cooler 15. Absorption of heat energy of the external-air flow 200 via the evaporator/condenser 13. |
| 11. Fifth dehumidifying mode | 11b | Dehumidification of the internal-air flow 100 via the evaporator 9 and the internal radiator 54. Cooling of elements such as batteries via the cooler 15. Absorption of heat energy of the external-air flow 200 via the evaporator/condenser 13. Removal of some of the heat energy via the first external radiator 84 connected in series. |
| 12. Sixth dehumidifying mode | 11c | Dehumidification of the internal-air flow 100 via the evaporator 9 and the internal radiator 54. Cooling of elements such as batteries via the cooler 15. Absorption of heat energy of the external-air flow 200 via the evaporator/condenser 13. Removal of some of the heat energy via the first external radiator 84 connected in parallel. |

The invention claimed is:

1. A thermal management device comprising an indirect air-conditioning circuit for a motor vehicle, comprising:
    a first loop for refrigerant fluid, in which a refrigerant fluid is configured to circulate, said first loop for refrigerant fluid comprising, in the direction of circulation of the refrigerant fluid, a compressor, a two-fluid heat exchanger, a first expansion device, an evaporator, a second expansion device and an evaporator/condenser;
    a first bypass pipe bypassing the evaporator/condenser and comprising a first shut-off valve;
    a first internal heat exchanger, allowing an exchange of heat between the high-pressure refrigerant fluid leaving the two-fluid heat exchanger and the low-pressure refrigerant fluid leaving the evaporator/condenser or leaving the first bypass pipe;

a second internal heat exchanger allowing an exchange of heat between the high-pressure refrigerant fluid leaving the first internal heat exchanger and the low-pressure refrigerant fluid circulating in the first bypass pipe, a second bypass pipe bypassing the first expansion device and the evaporator, said second bypass pipe comprising a third expansion device positioned upstream of a cooler;

a diverted branch connecting a first bifurcation positioned downstream of the two-fluid heat exchanger, between said two-fluid heat exchanger and the first internal heat exchanger, to a second bifurcation positioned upstream of the first internal heat exchanger, between said first internal heat exchanger and the first bifurcation, said diverted loop comprising a first external radiator, a second loop for heat-transfer fluid in which a heat-transfer fluid is configured to circulate, the two-fluid heat exchanger being arranged jointly, on the one hand, on the first loop for refrigerant fluid downstream of the compressor, between said compressor and the first expansion device, and, on the other hand, on the second loop for heat-transfer fluid.

2. The thermal management device as claimed in claim 1, the indirect air-conditioning circuit comprises a device for redirecting the refrigerant fluid leaving the two-fluid heat exchanger directly toward the first internal heat exchanger and/or toward the diverted branch.

3. The thermal management device as claimed in claim 2, wherein said device for redirecting the refrigerant fluid leaving the two-fluid heat exchanger comprises:

a first shut-off valve arranged on the main loop downstream of the first bifurcation, between the first and the second bifurcation, and a second shut-off valve arranged on the diverted branch downstream of the first bifurcation, between the first bifurcation and the first external radiator.

4. The thermal management device as claimed in claim 2, wherein said device for redirecting the refrigerant fluid leaving the two-fluid heat exchanger comprises a three-way valve arranged at the first bifurcation.

5. The thermal management device as claimed in claim 1, wherein the diverted branch comprises a non-return valve arranged downstream of the first external radiator, between said first external radiator and the second bifurcation, so as to block the refrigerant fluid coming from said second bifurcation.

6. The thermal management device as claimed in claim 1, wherein the second loop for heat-transfer fluid comprises:

the two-fluid heat exchanger, a first heat-transfer fluid circulation pipe comprising an internal radiator configured to have passing through it a flow of air internal to the motor vehicle, and connecting a first junction point positioned downstream of the two-fluid heat exchanger and a second junction point positioned upstream of said two-fluid heat exchanger, a second heat-transfer fluid circulation pipe comprising a second external radiator configured to have passing through it a flow of air external to the motor vehicle, and connecting the first junction point positioned downstream of the two-fluid heat exchanger and the second junction point positioned upstream of said two-fluid heat exchanger, and a pump positioned downstream or upstream of the two-fluid heat exchanger, between the first junction point and the second junction point.

7. The thermal management device as claimed in claim 6, wherein the device is configured to operate in a cooling mode in which the refrigerant fluid circulates in the first loop for refrigerant fluid, successively in:

the compressor where the refrigerant fluid transitions to a high pressure, the two-fluid heat exchanger, the first external radiator via the diverted branch, the first internal heat exchanger, the second internal heat exchanger, a first part of the refrigerant fluid enters the second bypass pipe, enters the third expansion device where it experiences a drop in pressure and transitions to a low pressure, said low-pressure refrigerant fluid then circulates in the cooler, a second part of the refrigerant fluid enters the first expansion device, where it experiences a drop in pressure and transitions to a low pressure, the evaporator and the first bypass pipe, the two parts of refrigerant fluid joining back together upstream of the first internal heat exchanger, the refrigerant fluid then passes through at least the first internal heat exchanger before returning to the compressor, and wherein, in the second loop for heat-transfer fluid, the heat-transfer fluid leaving the two-fluid heat exchanger circulates in the second external radiator of the second circulation pipe.

8. The thermal management device as claimed in claim 6, wherein the device is configured to operate in a dehumidifying mode in which the refrigerant fluid circulates in the first loop for refrigerant fluid, successively in:

the compressor where the refrigerant fluid transitions to a high pressure, the two-fluid heat exchanger, the first external radiator via the diverted branch, the first internal heat exchanger, the second internal heat exchanger, a first part of the refrigerant fluid enters the second bypass pipe, enters the third expansion device where it experiences a drop in pressure and transitions to a low pressure, said low-pressure refrigerant fluid then circulates in the cooler, a second part of the refrigerant fluid enters the first expansion device, where it experiences a drop in pressure and transitions to a low pressure, the evaporator, the second expansion device through which the refrigerant fluid passes without a drop in pressure, and the evaporator/condenser, the two parts of refrigerant fluid joining back together upstream of the first internal heat exchanger, the refrigerant fluid then passes through the first internal heat exchanger before returning to the compressor, and wherein, in the second loop for heat-transfer fluid, the heat-transfer fluid leaving the two-fluid heat exchanger circulates in the internal radiator and gives up heat energy.

9. The thermal management device as claimed in claim 6, wherein the device is configured to operate in another dehumidifying mode in which the refrigerant fluid circulates in the first loop for refrigerant fluid, successively in:

the compressor where the refrigerant fluid transitions to a high pressure, the two-fluid heat exchanger, a part of the refrigerant fluid passing through the first external radiator via the diverted branch and another part heading directly toward the first internal heat exchanger, the first internal heat exchanger, the second internal heat exchanger, a first part of the refrigerant fluid enters the second bypass pipe, enters the third expansion device where it experiences a drop in pressure and transitions to a low pressure, said low-pressure refrigerant fluid then circulates in the cooler, a second part of the refrigerant fluid enters the first expansion device, where it experiences a drop in pressure and transitions to a low pressure, the evaporator, the second expansion device through which the refrigerant fluid passes without a drop in pressure, and the evaporator/condenser, the first and second parts of refrigerant fluid joining back together upstream of the first internal heat exchanger, the refrigerant fluid then passes through the first internal heat exchanger before returning to the compressor, and wherein, in the second loop for heat-transfer fluid, the heat-transfer fluid leaving the two-fluid heat exchanger circulates in the internal radiator and gives up heat energy.

* * * * *